(12) United States Patent
Nishida et al.

(10) Patent No.: US 7,841,193 B2
(45) Date of Patent: Nov. 30, 2010

(54) REFRIGERANT FLOW-AMOUNT CONTROLLING DEVICE AND EJECTOR REFRIGERANT CYCLE SYSTEM USING THE SAME

(75) Inventors: Shin Nishida, Anjo (JP); Takayuki Sugiura, Anjo (JP); Hirotsugu Takeuchi, Nagoya (JP)

(73) Assignee: Denso Corporation, Kariya (JP)

( * ) Notice: Subject to any disclaimer, the term of this patent is extended or adjusted under 35 U.S.C. 154(b) by 959 days.

(21) Appl. No.: 11/708,165

(22) Filed: Feb. 15, 2007

(65) Prior Publication Data

US 2007/0186572 A1  Aug. 16, 2007

(30) Foreign Application Priority Data

Feb. 16, 2006  (JP) ............................. 2006-039399

(51) Int. Cl.
 *F25B 19/02* (2006.01)
(52) U.S. Cl. .......................................... 62/170; 62/500
(58) Field of Classification Search ................ 62/228.1, 62/500, 525, 170
See application file for complete search history.

(56) References Cited

U.S. PATENT DOCUMENTS 3,701,264 A * 10/1972 Newton ........................ 62/191

| | | |
|---|---|---|
| 6,477,857 B2 | 11/2002 | Takeuchi et al. |
| 6,574,987 B2 | 6/2003 | Takeuchi et al. |
| 2005/0178150 A1 | 8/2005 | Oshitani et al. |
| 2005/0268644 A1 | 12/2005 | Oshitani et al. |
| 2007/0000262 A1 | 1/2007 | Ikegami et al. |

* cited by examiner

*Primary Examiner*—Melvin Jones
(74) *Attorney, Agent, or Firm*—Harness, Dickey & Pierce, PLC

(57) ABSTRACT

A refrigerant flow-amount controlling device for an ejector refrigerant cycle system includes an ejector having a nozzle for decompressing refrigerant of a first stream of a branch portion, a first evaporator for evaporating refrigerant flowing out of the ejector, a throttle member for decompressing refrigerant of a second stream of the branch portion, a second evaporator disposed downstream of the throttle member and upstream of a refrigerant suction portion of the ejector, and an adjusting mechanism having a temperature-sensitive deformation member that is deformed in accordance with a variation in a refrigerant temperature of the cycle system to adjust one refrigerant passage area of the nozzle portion and the throttle means. The adjusting mechanism can be provided to adjust a flow ratio of a refrigerant amount decompressed by the nozzle portion of the ejector and a refrigerant amount drawn into the refrigerant suction port of the ejector.

32 Claims, 13 Drawing Sheets

REFRIGERANT FLOW-AMOUNT CONTROLLING DEVICE AND EJECTOR REFRIGERANT CYCLE SYSTEM USING THE SAME

CROSS REFERENCE TO RELATED APPLICATION

This application is based on Japanese Patent Application No. 2006-39399 filed on Feb. 16, 2006, the contents of which are incorporated herein by reference in its entirety.

BACKGROUND OF THE INVENTION

1. Field of the Invention

The present invention relates to a refrigerant flow-amount controlling device and an ejector refrigerant cycle system having an ejector. For example, the refrigerant flow-amount controlling device is suitably used for an ejector refrigerant cycle system.

2. Description of the Related Art

JP-A-2005-308380 (US 2005/0268644 A1) proposes an ejector refrigerant cycle system in which a branch portion is provided at an upstream side of a nozzle of an ejector. In this cycle system, one refrigerant stream from the branch portion flows into the nozzle portion of the ejector, and the other refrigerant stream from the branch portion flows into a refrigerant suction port of the ejector.

Furthermore, a first evaporator is located for evaporating refrigerant flowing out of the ejector, and a throttle mechanism and a second evaporator are located between the branch portion and the refrigerant suction portion. Therefore, refrigerant decompressed in the throttle mechanism flows into the second evaporator and is drawn into the refrigerant suction port of the ejector.

In the ejector refrigerant cycle system, a flow amount Gn of refrigerant passing through the branch portion is the total of a flow amount Gnoz of refrigerant flowing into the nozzle portion from the branch portion and a flow amount Ge of refrigerant flowing into the refrigerant suction port from the branch portion through the second evaporator (i.e., Gn=Gnoz+Ge). Accordingly, when the flow amount Gnoz is increased, the flow amount Ge is decreased, thereby decreasing the cooling capacity of the second evaporator. In contrast, when the flow amount Ge is increased, the flow amount Gnoz is decreased, thereby reducing a refrigerant suction capacity and a pressure increasing amount in the ejector.

Accordingly, it is difficult to suitably divide the flow amount Gn of refrigerant at the branch portion into the flow amount Gnoz of refrigerant flowing into the nozzle portion and the flow amount Ge of refrigerant flowing into the refrigerant suction port of the ejector while the cycle system has a high efficiency in the whole cycle. That is, a flow ratio between the flow amount Ge and the flow amount Gnoz is difficult to be suitably controlled in accordance with cooling load in the cycle system.

SUMMARY OF THE INVENTION

In view of the foregoing problems, it is an object of the present invention to provide a refrigerant flow-amount controlling device which can suitably control a flow ratio of a flow amount of refrigerant flowing into a nozzle portion of an ejector and a flow amount of refrigerant flowing into a refrigerant suction port of the ejector, based on a cooling load in a refrigerant cycle.

It is another object of the present invention to provide an ejector refrigerant cycle system in which a flow ratio of a flow amount of refrigerant flowing into a nozzle portion of an ejector and a flow amount of refrigerant flowing into a refrigerant suction port of the ejector can be suitably adjusted.

It is further another object of the present invention to provide an ejector refrigerant cycle system which can improve a cycle efficiency by suitably adjusting the flow ratio.

According to a first aspect of the present invention, a refrigerant flow-amount controlling device for an ejector refrigerant cycle system in which refrigerant from a radiator is divided at a branch portion into a first stream and a second stream includes: an ejector having a nozzle portion for decompressing refrigerant of the first stream, and a refrigerant suction port from which refrigerant is drawn by a high-speed flow of refrigerant jetted from the nozzle portion; a first evaporator for evaporating refrigerant flowing out of the ejector; a throttle means for decompressing and expanding refrigerant of the second stream; a second evaporator, disposed downstream of the throttle means and upstream of the refrigerant suction portion, for evaporating refrigerant; and an adjusting mechanism having a temperature-sensitive deformation member that is deformed in accordance with a variation in a refrigerant temperature of the cycle system to adjust one refrigerant passage area of the nozzle portion and the throttle means. Furthermore, the adjusting mechanism is provided to adjust a flow ratio of a first refrigerant flow amount decompressed by the nozzle portion of the ejector and a second refrigerant flow amount drawn into the refrigerant suction port of the ejector. Accordingly, it is possible to suitably adjust the flow ratio in accordance with a variation in a cooling load of a refrigerant cycle.

For example, the one refrigerant passage area is a refrigerant passage area of the nozzle portion or a refrigerant passage area of the throttle means. Furthermore, the adjusting mechanism may change the one refrigerant passage area, such that a ratio of the refrigerant passage area of the nozzle portion to a total of the refrigerant passage area of the nozzle portion and the refrigerant passage area of the throttle means becomes equal to or below 0.8.

According to a second aspect of the present invention, a refrigerant flow-amount controlling device for an ejector refrigerant cycle system includes: an ejector having a nozzle portion for decompressing refrigerant of a first stream divided from a branch portion downstream from a radiator, and a refrigerant suction port from which refrigerant is drawn by a high-speed flow of refrigerant jetted from the nozzle portion; a first evaporator for evaporating refrigerant flowing out of the ejector; a throttle means for decompressing and expanding refrigerant of a second stream divided from the branch portion; and a second evaporator, disposed downstream of the throttle means and upstream of the refrigerant suction portion, for evaporating refrigerant. In the refrigerant flow-amount controlling device, one of the ejector and the throttle means adjusts its refrigerant passage area based on a temperature of refrigerant on a downstream side of the radiator such that a pressure of refrigerant on the downstream side of the radiator approaches a predetermined value, and the other one of the ejector and the throttle means has a temperature-sensitive deformation member that changes a refrigerant passage area of the other one thereof to adjust a flow ratio of a first refrigerant flow amount decompressed by the nozzle portion of the ejector and a second refrigerant flow amount drawn into the refrigerant suction port of the ejector. Thus, a total flow amount in the ejector refrigerant cycle system can be controlled by one of the ejector and the throttle means, and the flow ratio between the first refrigerant amount and the second refrigerant amount can be controlled by the other one of the ejector and the throttle means. Accordingly, the cycle efficiency can be effectively increased in the whole cycle system.

According to a third aspect of the present invention, a refrigerant flow-amount controlling device for an ejector refrigerant cycle system includes: an ejector having a nozzle portion for decompressing refrigerant of a first stream divided from a branch portion downstream from a radiator, a refrigerant suction port from which refrigerant is drawn by a high-speed flow of refrigerant jetted from the nozzle portion, a diffuser portion in which the pressure of mixed refrigerant of the refrigerant jetted from the nozzle portion and the refrigerant drawn from the refrigerant suction port is increased by a pressure increasing amount; a first evaporator for evaporating refrigerant flowing out of the ejector; a throttle means for decompressing and expanding refrigerant of a second stream divided from the branch portion; a second evaporator, disposed downstream of the throttle means and upstream of the refrigerant suction portion, for evaporating refrigerant; and adjusting means for adjusting a flow ratio of a first refrigerant flow amount flowing into the nozzle portion and a second refrigerant flow amount drawn into the refrigerant suction port, based on the pressure increasing amount in the diffuser portion of the ejector.

Generally, the ejector recovers expansion loss energy during the refrigerant decompression at the nozzle portion by drawing the refrigerant from the refrigerant suction port and by increasing the refrigerant pressure at the diffuser portion. If the whole expansion loss energy (E) is recovered, the whole expansion loss energy (E) is the product (Ge * $\Delta P$) of the second refrigerant flow amount (Ge) and the pressure increasing amount ($\Delta P$) of the diffuser portion. Thus, if the first refrigerant flow amount (Gnoz) becomes at a predetermined value, the flow ratio between the first refrigerant flow amount and the second refrigerant flow amount can be controlled at a suitable value by controlling the pressure increasing amount. Therefore, it is possible to suitably control the flow ratio, thereby increasing the cycle efficiency. For example, the adjusting means may be provided in the throttle means or in the ejector.

In the refrigerant flow-amount controlling device according to any one of the first to third aspects, the refrigerant temperature in the cycle system may be a temperature of a low-pressure side refrigerant after being decompressed by the nozzle portion or the throttle means, or may be a temperature of a high-pressure side refrigerant before being decompressed by at least one of the nozzle portion and the throttle means. Furthermore, the temperature-sensitive deformation member may be a spring member having a spring constant changed in accordance with the refrigerant temperature in the cycle system.

In the refrigerant flow-amount controlling device according to any one of the first to third aspects, the first evaporator, the second evaporator and the ejector may be integrally joined to form an integrated unit. For example, when the first evaporator includes a first header tank for distributing and collecting refrigerant, and when the second evaporator includes a second header tank for distributing and collecting refrigerant, a longitudinal direction of the ejector may be set parallel to a longitudinal direction of the first header tank and a longitudinal direction of the second header tank. Alternatively, the ejector may further include an ejector body having the refrigerant suction port, an ejector housing for accommodating the nozzle portion and the ejector body. In this case, the ejector housing, the first evaporator and the second evaporator may be integrally joined.

According to the present invention, an ejector refrigerant cycle system can be provided with the refrigerant flow-amount controlling device according to any one of the first to third aspects.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1:
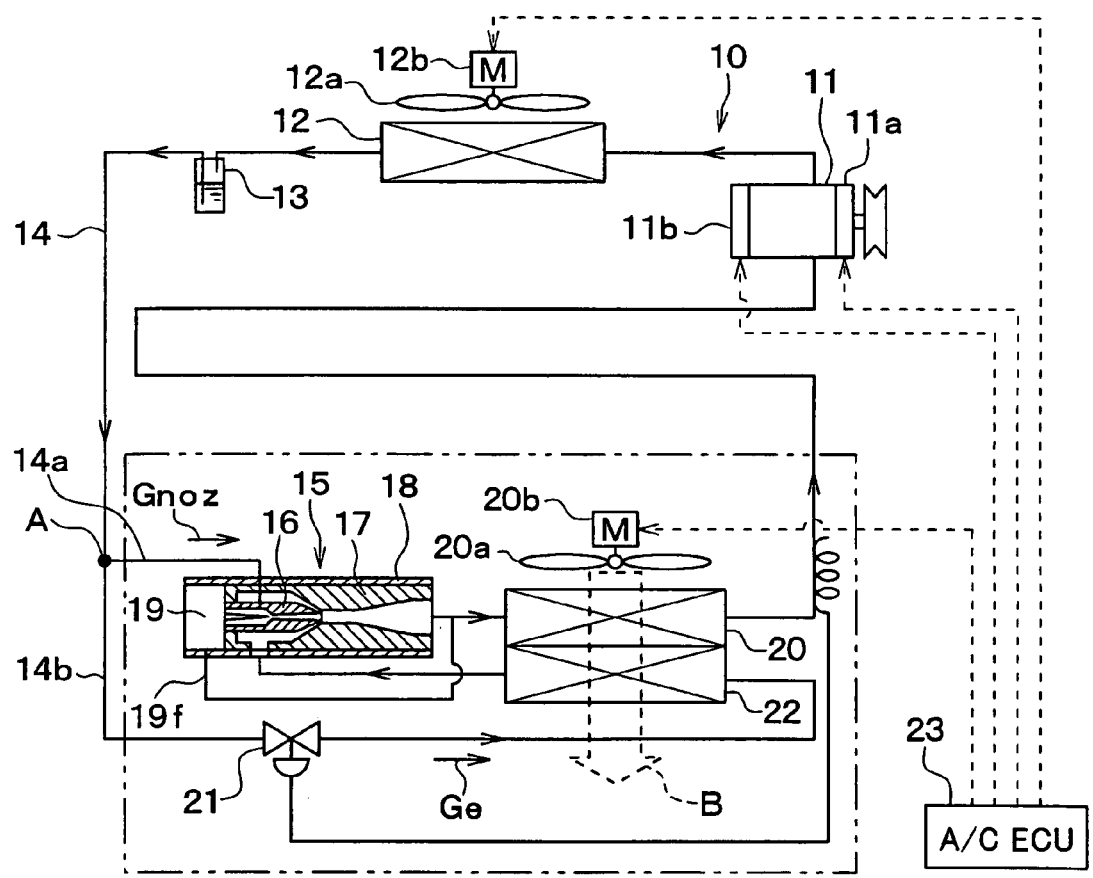
FIG. 1 is a schematic diagram showing an ejector refrigerant cycle system according to a first embodiment of the present invention.

The first embodiment of the present invention will be now described with reference to FIGS. 1 to 5. FIG. 1 shows an ejector refrigerant cycle system of the first embodiment.

First, in the ejector refrigerant cycle system 10, a compressor 11 sucks, compresses and discharges refrigerant. The compressor 11 is rotatably driven by a driving force transmitted thereto from a vehicle running engine (not shown) via a pulley and a belt. For example, in this embodiment, a well-known swash plate type variable displacement compressor capable of controlling a discharge volume variably and continuously by a control signal from an outside is employed as the compressor 11.

The discharge volume means a geometrical volume of an operating space in which the refrigerant is sucked and compressed and, specifically, a cylinder volume between the top dead center and the bottom dead center of the stroke of a piston. By changing the discharge volume, the discharge capacity of the compressor 11 can be adjusted. The changing of the discharge volume is performed, by controlling a pressure Pc of a swash plate chamber (not shown) constructed in the compressor 11 to vary a slant angle of a swash plate thereby to change the stroke of the piston.

The pressure Pc of the swash plate chamber of the compressor 11 is controlled by changing the ratio of a discharge refrigerant pressure Pd to a suction refrigerant pressure Ps introduced into the swash plate chamber, by using an electromagnetic volume control valve 11a driven by an output signal of an air-conditioning control unit 23 (A/C ECU) to be described later. With this, the compressor 11 can change the discharge volume continuously within a range of from about 0% to 100%.

Moreover, because the compressor 11 can change the discharge volume continuously within the range of about 0% to 100%, the compressor 11 can be brought substantially into an operation stop state by decreasing the discharge volume to nearly 0%. Thus, this embodiment adopts a clutch-less construction in which a rotary shaft of the compressor 11 is always coupled to the vehicle running engine via the pulley and the belt. Of course, even when a variable displacement compressor is used as the compressor 11, power may be transmitted from the vehicle running engine to the compressor 11 via an electromagnetic clutch.

Furthermore, when a fixed displacement compressor is employed as the compressor 11, the compressor may be operated intermittently by an electromagnetic clutch to perform control of the operating ratio, that is, the ratio of the on operation to the off operation, thereby controlling the discharge capacity of the compressor. Moreover, an electric compressor rotatably driven by an electric motor may be employed and the number of revolutions of the electric motor may be controlled by control of the frequency of an inverter or the like, thereby controlling the discharge capacity of the compressor.

A radiator 12 is connected to a downstream side of the refrigerant flow of the compressor 11. The radiator 12 is a heat exchanger that exchanges heat between high-pressure refrigerant discharged from the compressor 11 and the outside air (i.e., air outside a vehicle compartment) blown by a blower fan 12a to cool the high-pressure refrigerant so as to radiate the heat of the refrigerant. The blower fan 12a is an electrically operated fan driven by a motor 12b. Furthermore, the motor 12b is rotatably driven by a control voltage outputted from the air-conditioning control unit 23 to be described later.

In the ejector refrigerant cycle system 10 of the first embodiment, a normal flon-based refrigerant is used as the refrigerant, and a subcritical cycle is constructed in which the pressure of the high-pressure refrigerant does not increase to be equal to or higher than a supercritical pressure of the refrigerant. Therefore, the radiator 12 functions as a condenser for cooling and condensing the refrigerant.

On the downstream side of the radiator 12, is disposed a receiver 13 serving as a vapor/liquid separating unit for separating the refrigerant into vapor-phase refrigerant and liquid-phase refrigerant to store the liquid-phase refrigerant therein. A refrigerant piping 14 is connected to the downstream side of the receiver 13, and the liquid-phase refrigerant separated by the receiver 13 flows into the refrigerant piping 14.

In the refrigerant piping 14, a branch portion A is provided for branching the refrigerant flow into two flows, one of which flows into a nozzle portion 16 of an ejector 15 via a refrigerant piping 14a, and the other of which flows to a refrigerant suction port 17b of the ejector 15 via a refrigerant piping 14b.

Figure 2:
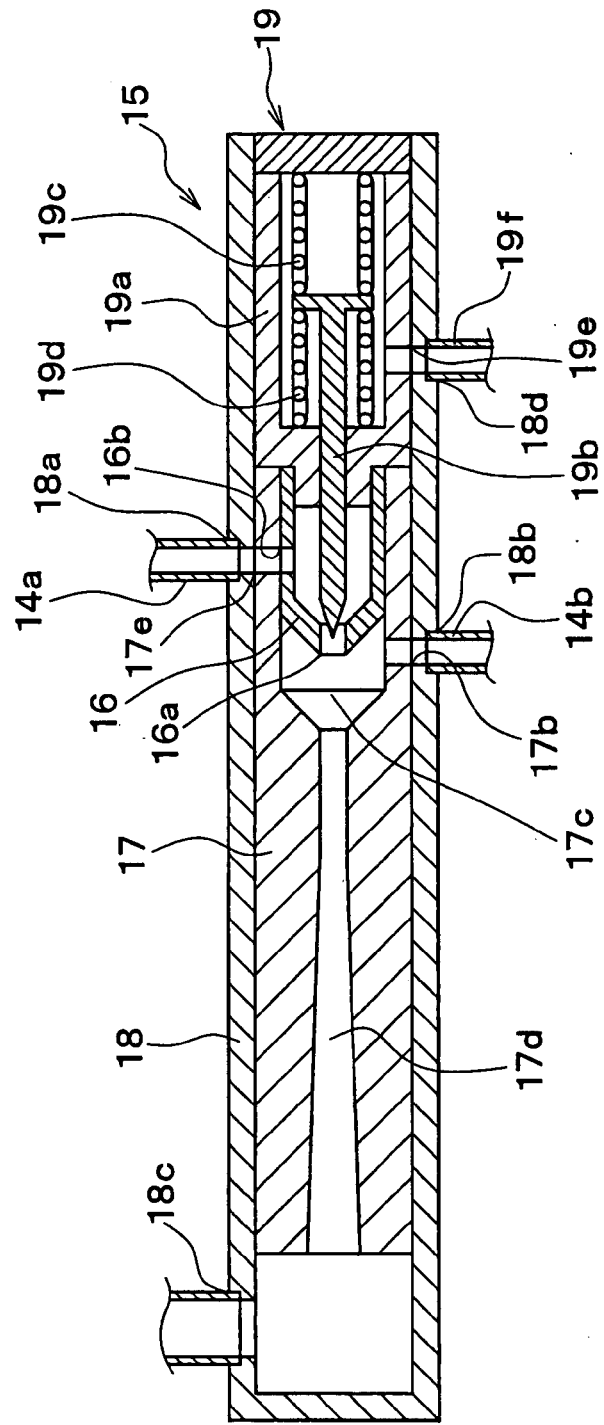
FIG. 2 is a sectional view showing an ejector according to the first embodiment.

The nozzle portion 16 of the ejector 15 functions as decompression means for decompressing the refrigerant, while acting as refrigerant circulating means for circulating the refrigerant by a suction action of the refrigerant flow ejected at high velocity from the nozzle portion 16. The detail structure of the ejector 15 of the first embodiment will be explained below with reference to FIGS. 2 to 4. FIG. 2 is a sectional view of the ejector 15. The ejector 15 of the first embodiment includes the nozzle portion 16, an ejector body 17, an ejector housing 18 and a passage area adjusting mechanism 19.

The nozzle portion 16 has a substantially cylindrical shape with a tip end tapered toward the flow direction of refrigerant. The nozzle portion 16 throttles the passage area of the refrigerant to a small degree along the tapered shape thereof to decompress and expand the refrigerant in an isentropic manner. Furthermore, the nozzle portion 16 has a refrigerant ejection port 16a, from the tip end of which the refrigerant is ejected, and a nozzle portion refrigerant inlet 16b disposed on its side for allowing the refrigerant branched at the branch portion A to flow into the nozzle portion 16.

The nozzle portion 16 is fixed to the inside of the ejector body 17 by press-fitting or the like so as to prevent a leakage of the refrigerant from a press-fitted part (fixed part). In order to prevent a leakage of the refrigerant from the fixed part, the nozzle portion 16 may be connected and fixed by connection means, such as an adhesive, weld, pressure welding, soldering, or the like.

The ejector body 17 has a substantially cylindrical shape, and supports and fixes the nozzle portion 16. The ejector body 17 includes a refrigerant suction port 17b, a mixing portion 17c, and a diffuser portion 17d. The refrigerant suction port 17b is a suction port through which the refrigerant on the downstream side of a second evaporator 22 to be described later is sucked into the ejector body 17, and is provided in communication with the refrigerant ejection port 16a of the nozzle portion 16.

The mixing portion 17c is a space for mixing the high-velocity refrigerant flow ejected from the refrigerant ejection port 16a and the suction refrigerant sucked from the refrigerant suction port 17b, and disposed on the downstream side of the nozzle portion 16 and the refrigerant suction port 17b.

The diffuser portion 17d is a pressure increasing portion disposed on the downstream side of the mixing portion 17c and adapted for reducing the velocity of the refrigerant flow so as to increase the refrigerant pressure. The diffuser portion 17d is formed in such a shape to gradually increase the passage area of the refrigerant and has a function of reducing the velocity of the refrigerant flow to increase the refrigerant pressure, that is, a function of converting the velocity energy of the refrigerant to the pressure energy thereof.

The ejector body 17 has a body refrigerant inlet 17e through which the refrigerant branched by the branch portion A flows into the nozzle portion refrigerant inlet 16b. Furthermore, the ejector body 17 is fixed to the inside of the ejector housing 18 with an adhesive or the like to prevent a leakage of the refrigerant from an adhered part. The ejector body 17 may be fixed to the ejector housing 18 via a seal material, such as an O-ring or the like, as a matter of course.

The ejector housing 18 has a substantially cylindrical shape, and serves to fix and protect the components 16, 17, and 19 of the ejector 15.

The ejector housing 18 is provided with a high-pressure refrigerant inlet 18a for setting communication between the refrigerant piping 14a and the body refrigerant inlet 17e of the ejector body 17, and a suction refrigerant inlet 18b for setting communication between the branch piping 14b and the refrigerant suction port 17b of the ejector body 17. The ejector housing 18 is further provided with a refrigerant flow outlet 18c for allowing the refrigerant on an outlet side of the diffuser portion 17d to flow out to the upstream side of a first evaporator 20 to be described later, and a refrigerant communication port 18d for setting communication between the inside of the passage area adjusting mechanism 19 and the refrigerant on the outlet side of the diffuser portion 17d.

The ejector housing 18 is made of the same material (for example, aluminum) as that constituting the refrigerant pipings 14a and 14b which are respectively connected to the inlets and outlets 18a to 18d. These piping parts are respectively brazed to the inlets and outlets so as to prevent a leakage of the refrigerant from the connected parts.

The passage area adjusting mechanism 19 includes a body portion 19a, a needle portion 19b, a bias spring 19c, and a shape memory spring 19d. The body portion 19a slidably supports the needle portion 19b in the longitudinal direction of the ejector 15, while accommodating therein the bias spring 19c and the shape memory spring 19d, and thus is fixed to the inside of the ejector housing 18.

Furthermore, the body portion 19a is provided with a refrigerant communication piping 19f and a refrigerant communication hole 19e, so as to communicate the refrigerant on the outlet side of the diffuser portion 17d with a space for accommodating therein the shape memory spring 19d via the refrigerant communication port 18d of the ejector housing 18.

The needle portion 19b has a substantially needle-like elongated shape, and is disposed coaxially such that the longitudinal axis of the needle portion 19b conforms to the axis of the refrigerant ejection port 16a of the nozzle portion 16. The tip end of the needle portion 19b on a side of the nozzle portion 16a is tapered, and disposed at the substantial center of the refrigerant ejection port 16a.

Thus, a clearance between the tip end of the needle portion 19b and the refrigerant ejection port 16a constitutes a throttle passage of the refrigerant ejected from the refrigerant ejection port 16a. As mentioned above, since the needle portion 19b is slidably supported in the longitudinal direction of the ejector 15 with respect to the body portion 19a, the movement of the needle portion 19b changes the area Anoz of the nozzle refrigerant passage (nozzle throttle passage).

Since the needle portion 19b is slidably supported by the body portion 19a, a clearance is provided in the sliding part between the needle portion 19b and the body portion 19a. In the first embodiment, the distance of the sliding part (the length of the seal) is sufficiently ensured to prevent a leakage of the refrigerant from the sliding part. It is apparent that means for constituting a labyrinth seal on the side of the needle portion 19b, or means for slidably supporting the needle portion 19b by the body portion 19a via the O-ring may be employed to prevent the leakage of the refrigerant.

The needle portion 19b has a disk-shaped spring bearing disposed on the other end thereof. The spring bearing of the needle portion 19b receives loads from the bias spring 19c and the shape memory spring 19d. The bias spring 19c is a coil spring, and applies a load to a spring bearing part of the needle portion 19b in the direction that causes the needle portion 19b to approach the refrigerant ejection port 16a of the nozzle portion 16, or in the direction that reduces the nozzle passage area Anoz.

On the other hand, the shape memory spring 19d applies a load to the spring bearing part of the needle portion 19b in the direction that moves the needle portion 19b away from the refrigerant ejection port 16a of the nozzle portion 16, or in the direction that enlarges the nozzle passage area Anoz.

The structure of the shape memory spring 19d will be described in detail. The shape memory spring 19d is made of shape memory alloy and has the same shape as that of the coil spring. The shape memory spring 19d functions as the coil spring having a predetermined spring constant at a certain temperature, but the spring constant is varied according to a change in refrigerant temperature to cause the deformation of the spring.

Figure 3:
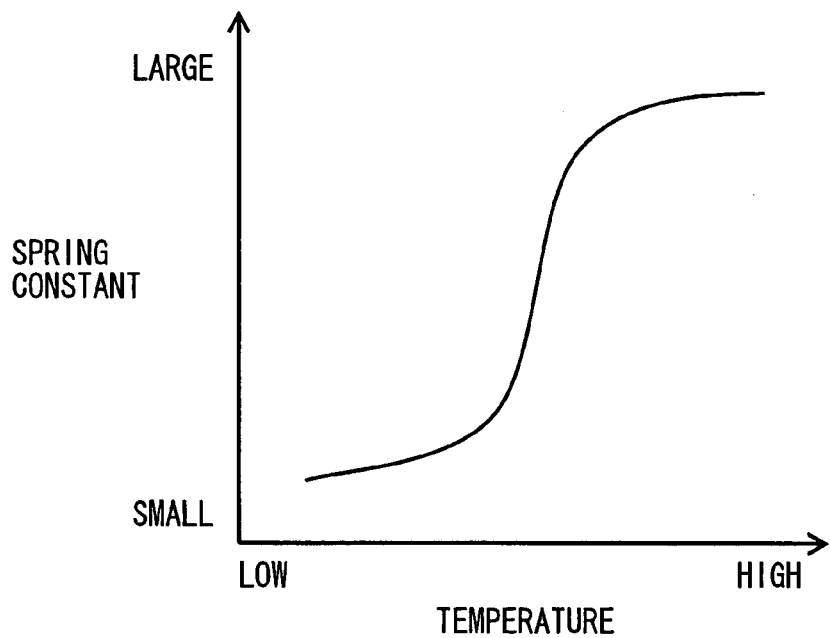
FIG. 3 is a graph showing a relationship between a temperature and a spring constant according to the first embodiment.
Figure 4:
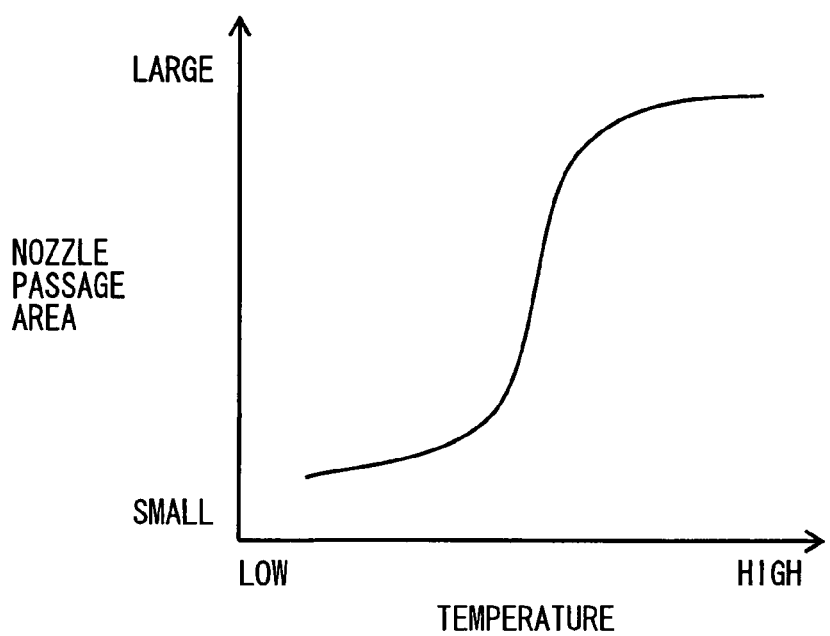
FIG. 4 is a graph showing a relationship between a temperature and a nozzle passage area of the ejector according to the first embodiment.

The shape memory spring 19d of the embodiment is configured to have the spring constant increased with an increase in temperature as shown in FIG. 3. Thus, the shape. memory spring 19d is deformed to extend axially with the increase in refrigerant temperature of the cycle (e.g., a low-pressure refrigerant temperature after being decompressed by the nozzle portion 16 or the thermal expansion valve 21). This causes the needle portion 19b to be displaced in the direction away from the refrigerant ejection port 16a, that is, in the direction that enlarges the nozzle passage area Anoz with the increase in temperature as shown in FIG. 4.

Furthermore, in the embodiment, the space of the body portion 19a for accommodating therein the shape memory spring 19d is in communication with the refrigerant on the outlet side of the diffuser portion 17d via the refrigerant communication port 18d of the ejector housing 18 and via the refrigerant communication hole 19e of the body portion 19a as mentioned above. Thus, the shape memory spring 19d is deformed according to the change in temperature of the refrigerant on the outlet side of the diffuser portion 17d.

Therefore, in the first embodiment, the refrigerant temperature in the passage area adjusting mechanism 19 is a temperature of the refrigerant on the outlet side of the diffuser portion 17d, the shape memory spring 19d serves as a temperature-sensitive deformation member, and the passage area adjusting mechanism 19 serves as a flow amount adjusting mechanism.

The ejector 15 of the embodiment can be structured easily by fixing the ejector body 17 with the nozzle portion 16 fixed therein to the inside of the ejector housing 18, and then fixing the passage area adjusting mechanism 19 to the inside of the ejector housing 18.

Next, the first evaporator 20 is disposed on an outlet side of the diffuser portion 17d of the ejector 15 as shown in FIG. 1. The first evaporator 20 is a heat exchanger that exchanges heat between the low-pressure refrigerant decompressed by the nozzle portion 16 of the ejector 15 and air blown by a blower fan 20a to allow the low-pressure refrigerant to absorb the heat, thereby cooling the air.

The blower fan 20a is an electrically operated fan driven by a motor 20b. The motor 20b is rotatably driven by a control voltage outputted from the air-conditioning control unit 23 to be described later. The downstream side of the refrigerant flow of the first evaporator 20 is coupled to the suction side of the compressor 11.

A thermal expansion valve 21 and the second evaporator 22 are disposed in the branch piping 14b into which the other refrigerant branched by the branch portion A flows. The thermal expansion valve 21 adjusts the refrigerant passage area Ae of its valve body portion (not shown) according to the degree of superheat of the refrigerant on the outlet side of the first evaporator 20, thereby decompressing the refrigerant passing through the valve body portion of the thermal expansion valve 21, while adjusting the flow amount of the refrigerant to perform control of the refrigerant flow such that the superheat degree of the refrigerant on the outlet side of the first evaporator 20 approaches a predetermined value. For this reason, the thermal expansion valve 21 constitutes throttle means of the embodiment.

The refrigerant passage area Ae of the thermal expansion valve 21 is adjusted such that the superheat degree of the refrigerant on the outlet side of the first evaporator 20 becomes a predetermined value. In the cycle structure of the first embodiment, the nozzle passage area Anoz of the nozzle portion 16 of the ejector 15 is also changed according to the temperature of the refrigerant on the outlet side of the diffuser portion 17d (the refrigerant temperature in the refrigerant cycle.)

Figure 15:
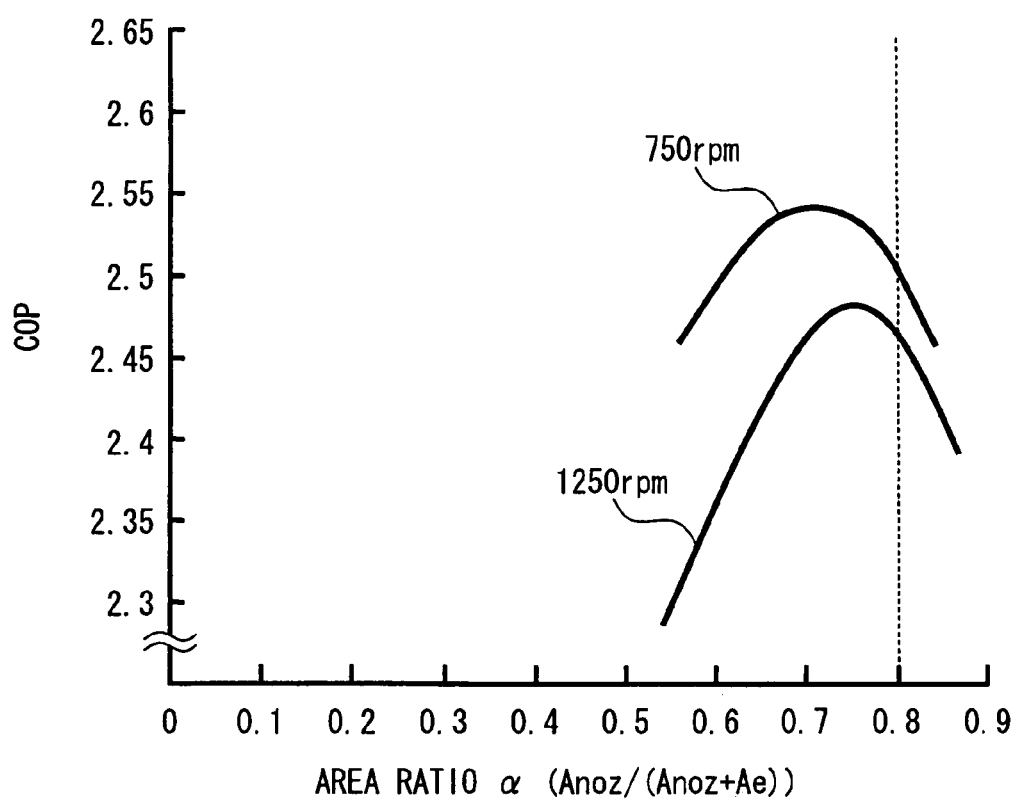
FIG. 15 is a graph showing a relationship between an area ratio (Anoz/(Anoz+Ae)) and cycle efficiency COP according to embodiments of the present invention.

In the first embodiment, the thermal expansion valve 21 and the passage area adjusting mechanism 19 of the ejector 15 are structured such that the area ratio $\alpha(\alpha=\text{Anoz}/(\text{Anoz}+\text{Ae}))$ is 0.8 or less (see FIG. 15). Such the structure in the ejector refrigerant cycle system 10 can be implemented easily, for example, by restricting a range of movement of the needle portion 19b by providing an alignment portion in the needle portion 19b of the passage area adjusting mechanism 19, or by restricting a range of movement of the valve body of the thermal expansion valve 21.

Figure 5:
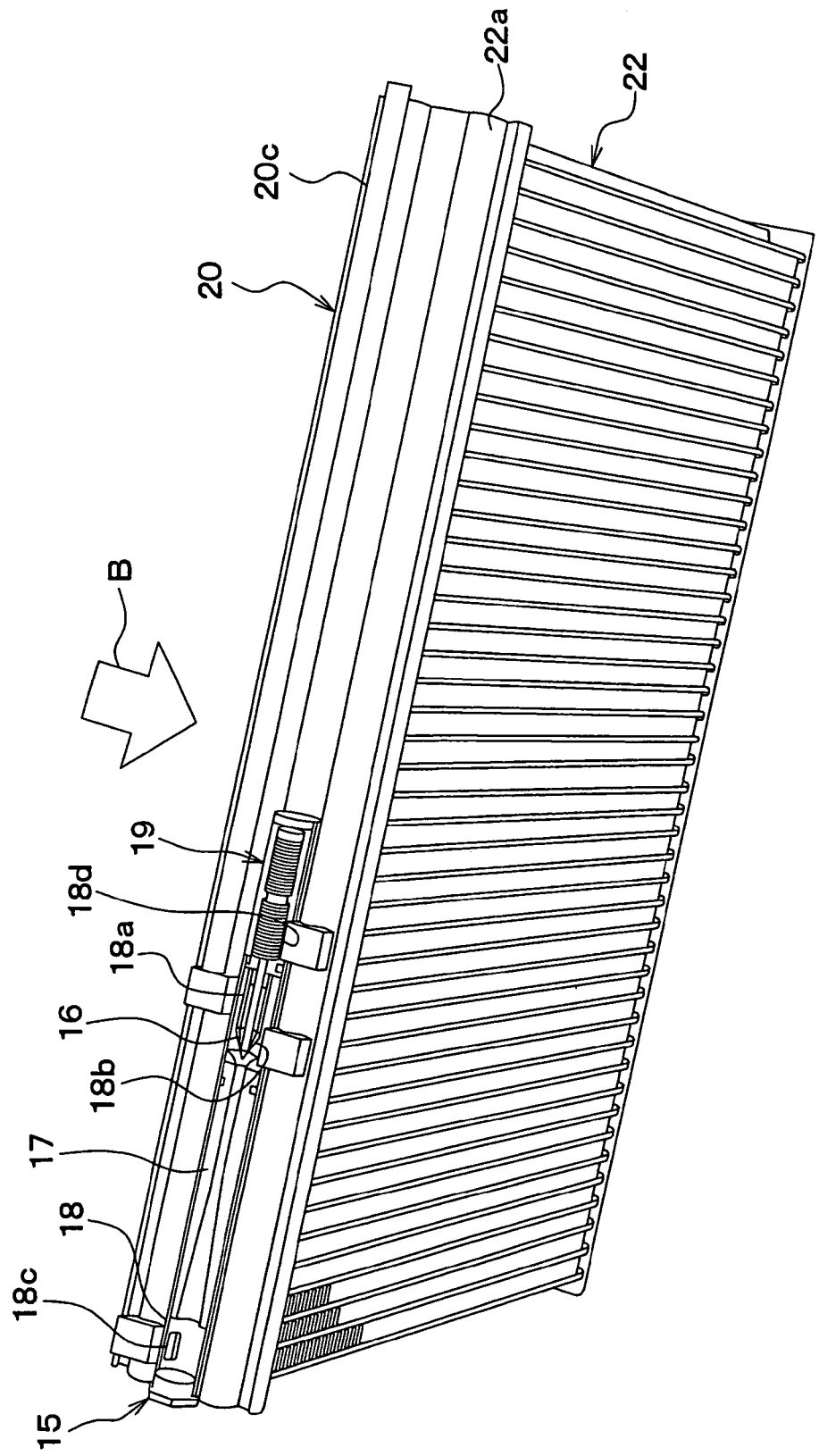
FIG. 5 is a perspective view of an integrated unit of an ejector and first and second evaporators according to the first embodiment.

FIG. 15 is a graph showing a relationship between the area ratio $\alpha(\alpha=\text{Anoz}/(\text{Anoz}+\text{Ae}))$ and the cycle efficiency COP when the rotation speed of the compressor 11 is 750 rpm and 1250 rpm. The graph of FIG. 5 is performed in a state where an outside air temperature is 45° C. and the inside air temperature (relative humidity 50%) is 40° C.

This area ratio α determines the flow amount ratio $\eta(\eta=\text{Ge}/\text{Gnoz})$ of a flow amount Ge of the refrigerant sucked into the refrigerant suction port 17b through the thermal expansion valve 21 to a flow amount Gnoz of the refrigerant decompressed and expanded by the nozzle portion 16. According to FIG. 15, when the area ratio $\alpha(\alpha=\text{Anoz}/(\text{Anoz}+\text{Ae}))$ is larger than 0.8, the flow amount ratio $\eta(\eta=\text{Ge}/\text{Gnoz})$ is greatly decreased, thereby reducing the cooling capacity of the second evaporator 22. By adjusting the area ratio $\alpha(\alpha=\text{Anoz}/(\text{Anoz}+\text{Ae}))$ to be equal to or lower than 0.8, it can prevent the cooling capacity of the second evaporator 22 from being greatly reduced.

According to the first embodiment, the flow amount ratio $\eta(\eta=\text{Ge}/\text{Gnoz})$ can be adjusted to an appropriate value under a predetermined cooling load so as to exert a high cycle efficiency in the whole cycle of the ejector refrigerant cycle system. Such adjustment can be carried out easily by changing the spring constant and the set load of the bias spring 19c of the ejector 15.

The second evaporator 22 is a heat absorber for evaporating the refrigerant on the downstream side of the thermal expansion valve 21 to exert a heat absorbing action. In the embodiment, as shown in a schematic perspective view of FIG. 5, the first evaporator 20 and the second evaporator 22 can be assembled to an integrated structure, as an example. Specifically, the components of the first evaporator 20 and those of the second evaporator 22 are made of aluminum and brazed to the integrated structure.

Thus, the air blown by the above-mentioned blower fan 20a flows in the direction of the arrow B, and is first cooled by the first evaporator 20 and then by the second evaporator 22. In other words, the first evaporator 20 and the second evaporator 22 cool the same space to be cooled.

Furthermore, as shown in FIG. 5, the ejector 15 can be brazed integrally to the first evaporator 20 and the second evaporator 22. Specifically, the ejector housing 18 is connected between first and second header tanks 20c and 22a of the first and second evaporators 20 and 22 such that the longitudinal direction of the ejector 15 is parallel to that of the header tanks 20c and 22a of the first and second evaporators 20 and 22.

As known in the general art, the first and second header tanks 20c and 22a are to distribute and collect the refrigerant flowing into and from the first and second evaporators 20 and 22. Thus, the header tanks 20c and 22a can be connected easily by shortening a connection distance between the first and second evaporators 20 and 22 and each of the inlets and outlets 18a to 18d of the ejector housing 18.

Since the longitudinal direction of the ejector 15 is parallel to that of the first and second header tanks 20c and 22a, the ejector 15 can be prevented from unnecessarily protruding in the air flow direction of the arrow B, thereby reducing the size of a refrigerant flow-amount controlling device and the size of the whole cycle. A part enclosed by an alternate long and two short dashes line in FIG. 1 constitutes the refrigerant flow-amount controlling device of this embodiment.

Furthermore, the ejector housing 18 is brazed to the first evaporator 20 and the second evaporator 22. After brazing, the nozzle portion 16, the ejector body 17, and the passage area adjusting mechanism 19 can be fixed inside the ejector housing 18. As a result, the nozzle portion 16 or the like can be prevented from being thermally deformed due to the high temperature in brazing. For example, the brazing temperature of aluminum is about 600 degrees.

FIG. 5 shows a section of the ejector 15 for clarification of the corresponding relationship with FIG. 2. Also, in the first embodiment, the ejector 15, the first and second evaporators 20 and 22 and the thermal expansion valve 21 (part enclosed by an alternate long and two short dashes line of FIG. 1) constitute the refrigerant flow-amount controlling device for adjusting the flow amount of the refrigerant in the ejector refrigerant cycle system 10.

The air-conditioning control unit 23 is constructed of a well-known microcomputer including a CPU, a ROM, a RAM and the like and its peripheral circuit. The air-conditioning control unit 23 performs various kinds of computations and processing on the basis of control programs stored in the ROM to control the operations of the above-mentioned various kinds of devices 11a, 12b, 20b, and the like.

Moreover, to the air-conditioning control unit 23 are inputted detection signals from a group of various kinds of sensors and various operating signals from an operating panel (not shown). Specifically, as the group of sensors, an outside air sensor for detecting the temperature of the outside air (i.e., the temperature of air outside the vehicle compartment) or the like is provided. Furthermore, the operating panel is provided with an operating switch for operating a refrigeration device, a temperature setting switch for setting a cooling temperature of the space to be cooled, and the like.

Next, an operation of the first embodiment with the above-mentioned arrangement in the ejector refrigerant cycle system 10 will be described below. First, when the vehicle running engine is operated, a rotational drive force is transmitted from the vehicle running engine to the compressor 11. Further, when the operating signal of the operating switch is inputted to the air-conditioning control unit 23 from the operating panel, an output signal is outputted from the air-conditioning control unit 23 to the electromagnetic volume control valve 11a based on the control program previously stored.

The discharge volume of the compressor 11 is determined by this output signal. The compressor 11 sucks vapor-phase refrigerant on the downstream side of the first evaporator 20 and discharge the compressed refrigerant therefrom. The high-temperature and high-pressure vapor-phase refrigerant discharged from the compressor 11 flows into the radiator 12 to be cooled and condensed by the outside air in the radiator 12. The condensed refrigerant of the radiator 12 is separated into vapor-phase refrigerant and liquid-phase refrigerant by the receiver 13. Then, the liquid-phase refrigerant flowing from the receiver 13 is divided by the branch portion A into the refrigerant piping 14a and the branch piping 14b.

The refrigerant having flown from the branch portion A to the refrigerant piping 14a flows into the nozzle portion 16 via the high-pressure refrigerant inlet 18a, the ejector body refrigerant inlet 17e, and a nozzle portion refrigerant inlet 16d. The refrigerant flowing into the nozzle portion 16 is decompressed and expanded by the nozzle portion 16. Since the pressure energy of the refrigerant is converted to the velocity energy in the decompression and expansion, the refrigerant is ejected from the refrigerant ejection port 16a of the nozzle portion 16 at high velocity.

The refrigerant suction action of the high-velocity refrigerant flow jetted from the ejection port 16a sucks the refrigerant having passed through the second evaporator 22 from the refrigerant suction port 17b. The refrigerant ejected from the nozzle portion 16 and the refrigerant sucked from the refrigerant suction port 17b are mixed by the mixing portion 17c on the downstream side of the nozzle portion 16 to flow into the diffuser portion 17d. In this diffuser portion 17d, the velocity energy of the refrigerant is converted to the pressure energy thereof by enlarging the passage area, resulting in an increase in pressure of the refrigerant.

The refrigerant flowing from the diffuser portion 17d of the ejector 15 flows into the first evaporator 20, in which the low-pressure refrigerant absorbs heat from the blown air of the blower fan 20a to be evaporated. The refrigerant having passed through the first evaporator 20 is sucked into and compressed again by the compressor 11.

The refrigerant having branched from the branch portion A into the branch piping 14b is decompressed by the thermal expansion valve 21 and hence has a flow amount adjusted by the valve 21, and then flows into the second evaporator 22. The thermal expansion valve 21 adjusts the refrigerant passage area Ae of its valve body portion such that the superheat degree of the refrigerant on the outlet side of the first evaporator 20 approaches to a predetermined value. For this reason, the refrigerant on the downstream side of the first evaporator 20 becomes the vapor phase having a predetermined degree of superheat, thereby preventing the liquid-phase refrigerant from flowing into the compressor 11.

The low-pressure refrigerant having flown from the thermal expansion valve 21 to the second evaporator 22 further absorbs heat from the blown air of the blower fan 20a, which has been cooled by the first evaporator 20, so that the refrigerant is evaporated. And, the refrigerant evaporated at the second evaporator 22 is sucked into the refrigerant suction port 17b of the ejector 15 via a suction port side piping 14d, and is mixed with the liquid-phase refrigerant having passed through the nozzle portion 16 in the mixing portion 17c. The mixed refrigerant of the mixing portion 17c flows through the diffuser portion 17d to be pressure-increased in the diffuser portion 17d.

As the ejector refrigerant cycle system 10 of this embodiment is operated as mentioned above, the refrigerant on the outlet side of the diffuser portion 17d is supplied to the first evaporator 20, while the refrigerant flowing from the thermal expansion valve 21 is also supplied to the second evaporator 22. Therefore, the first evaporator 20 and the second evaporator 22 can exert the cooling effect at the same time.

The refrigerant evaporation pressure of the first evaporator 20 is a pressure after being increased by the diffuser portion 17d, and on the other hand, the refrigerant outlet side of the second evaporator 22 is connected to the refrigerant suction port 17b of the ejector 15, which can apply the lowest pressure directly after the decompression at the nozzle portion 16 to the second evaporator 22. Thus, the refrigerant evaporation pressure (refrigerant evaporation temperature) of the second evaporator 22 can be set lower than that of the first evaporator 20.

Furthermore, the work rate of compression by the compressor 11 can be decreased by an increased amount of suction pressure of the compressor 11 by the pressure increasing action of the diffuser portion 17d, which can exert a power saving effect. The flow amount ratio $\eta$ is previously adjusted to an appropriate value under a predetermined cooling load, so that the high cycle efficiency can be obtained in the whole cycle.

According to the ejector refrigerant cycle system 10 of the first embodiment, when the cooling load is increased, the degree of superheat of the refrigerant on the downstream side of the first evaporator 20 also increases. In this case, in order to adjust the superheat degree within a predetermined range, the thermal expansion valve 21 increases the refrigerant passage area Ae of its valve body portion.

The increase in cooling load causes an increase in temperature of the refrigerant on the outlet side of the diffuser portion 17d. Thus, this increase in refrigerant temperature leads to an increase in spring constant of the shape memory spring 19d as shown in FIG. 3, so that the needle portion 19b is moved to enlarge the nozzle passage area Anoz of the nozzle portion 16.

In contrast, when the cooling load is decreased, the degree of superheat of the refrigerant on the downstream side of the first evaporator 20 also decreases, and hence in order to adjust the superheat degree within the predetermined range, the thermal expansion valve 21 shrinks the refrigerant passage area Ae of its valve body portion. Furthermore, this also decreases the temperature of the refrigerant (the temperature of the cycle) on the outlet side of the diffuser portion 17d, resulting in a decrease in spring constant of the shape memory spring 19d, so that the needle portion 19b is moved to reduce the nozzle passage area Anoz of the nozzle portion 16.

According to the first embodiment, the refrigerant passage area Ae of the thermal expansion valve 21 and the nozzle passage area Anoz of the nozzle portion 16 are simultaneously enlarged or reduced according to increase or decrease in cooling load, whereby the flow amount ratio $\eta$ is held to an appropriate value. As a result, even when the cooling load is changed in the refrigerant cycle of the ejector refrigerant cycle system 10, by suitably using the refrigerant flow-amount controlling device of the first embodiment to the ejector refrigerant cycle system 10, the whole cycle can be operated with a high cycle efficiency.

Second Embodiment

A second embodiment of the present invention will be now described with reference to FIG. 6.

In the above-described first embodiment, the thermal expansion valve 21 controls the refrigerant passage area Ae such that the superheat degree of the refrigerant on the downstream side of the first evaporator 20 is in the predetermined range. In the second embodiment, however, as shown in FIG. 6, the thermal expansion valve 21 is not provided, but another thermal expansion valve 24 is disposed on the downstream side of the receiver 13 and on the upstream side of the branch portion A.

The thermal expansion valve 24 has the same structure as that of the thermal expansion valve 21 of the above-described first embodiment, and is to control its opening degree such that the degree of superheat of the refrigerant on the downstream side of the first evaporator 20 is in a predetermined range. Furthermore, in the second embodiment, a fixed throttle 25 is disposed on the upstream side of the second evaporator 22 in the branch piping 14b.

The fixed throttle 25 may be constructed of a capillary tube or an orifice. Thus, the refrigerant passage area Ae of the fixed throttle 25 of the second embodiment is not changed. Moreover, in the second embodiment, the flow amount ratio η is adjusted under a predetermined cooling load to a value that can exert the high cycle efficiency in the whole cycle.

Other components of this embodiment have the same structures as those of the above-described first embodiment. In FIG. 6, the same reference numerals will be used to refer to parts having the same or equivalent functions as those in the entire configuration diagram (FIG. 1) of the first embodiment. A part enclosed by an alternate long and two short dashes line in FIG. 6 constitutes a refrigerant flow-amount controlling device of this embodiment.

When the ejector refrigerant cycle system of the embodiment with the above-mentioned structure is actuated, like the first embodiment, the compressor 11 is operated, the refrigerant discharged from the compressor 11 is cooled and condensed by the radiator 12, and the refrigerant on the downstream side of the radiator 12 is separated by the receiver 13 into vapor-phase refrigerant and liquid-phase refrigerant. The liquid-phase refrigerant flowing from the receiver 13 passes through the thermal expansion valve 24, and then is divided into the refrigerant piping 14a side and the branch piping 14b side from the branch portion A.

Like the first embodiment, the thermal expansion valve 24 adjusts the refrigerant passage area of its valve body portion such that the superheat degree of the refrigerant on the outlet side of the first evaporator 20 approaches a predetermined value, like the thermal expansion valve 21 of the first embodiment. Thus, the refrigerant on the downstream side of the first evaporator 20 becomes a vapor-phase state having a predetermined superheat degree, thereby preventing the liquid-phase refrigerant from flowing into the compressor 11.

The refrigerant having flown from the branch portion A into the refrigerant piping 14a is decompressed and expanded by the nozzle portion 16, is mixed with the refrigerant after absorbing the heat at the second evaporator 22, and has its pressure increased by the diffuser portion 17d to flow into the first evaporator 20. The refrigerant flowing into the first evaporator 20 exerts the heat absorbing action at the first evaporator 20, and is sucked into the compressor 11.

In contrast, the refrigerant having passed from the branch portion A into the branch piping 14b is decompressed by the fixed throttle 25 to flow into the second evaporator 22. Then, the refrigerant also exerts the heat absorbing action at the second evaporator 22, and is sucked into the refrigerant suction port 17b of the ejector 15 and mixed with the liquid-phase refrigerant passing through the nozzle portion 16 in the mixing portion 17c to flow into the diffuser portion 17d. Thus, the operation of the ejector refrigerant cycle system of this embodiment can obtain the same effect as that of the first embodiment.

Furthermore, according to the ejector refrigerant cycle system of the embodiment, when the cooling load is increased, the degree of superheat of the refrigerant on the downstream side of the first evaporator 20 increases, and hence in order to adjust the superheat degree within a predetermined range, the thermal expansion valve 24 increases the refrigerant passage area Ae of its valve body portion. That is, the flow amounts of refrigerant supplied to the first and second evaporators 20 and 22 are to be increased.

In order to increase the flow amounts of the refrigerant supplied to the first and second evaporators 20 and 22, in the second embodiment, the air-conditioning control unit 23 increases the discharge volume of the compressor 11 to increase the flow amount of refrigerant discharged from the compressor 11. As a matter of course, the ejector refrigerant cycle system employing an electric compressor which is rotatably driven by an electric motor can increase the number of revolutions of the compressor thereby to increase the discharged flow amount.

In FIG. 15 mentioned above, a change in cycle efficiency (COP) is plotted when the cooling load is varied by experimentally changing the number of revolutions of the compressor 11. As can be seen from FIG. 15, as the number of revolutions of the compressor (discharged flow amount) is increased, the area ratio α which becomes a peak of the cycle efficiency (COP) is larger than that before increasing the number of revolutions. This means that when the cooling load is increased, the nozzle passage area Anoz of the nozzle portion 16 should be increased. That is, it means that the Gnoz needs to be increased.

This is based on the following reason. For example, in a case where the temperature and absolute humidity of air for the heat exchange at the first and second evaporators 20 and 22 are heightened to increase the cooling load, the air whose temperature and absolute humidity have been heightened is cooled and dehumidified sufficiently by the first evaporator 20 disposed on the windward side, and further cooled by the second evaporator 22. For this reason, the cooling load of the first evaporator 20 is higher than that of the second evaporator 22, and the Gnoz needs to be increased.

In the second embodiment, when the cooling load is increased in the cycle, the temperature of the refrigerant on the outlet side of the diffuser portion 17d also increases like the first embodiment. This leads to an increase in spring constant of the shape memory spring 19d, resulting in an increase in Anoz. Thus, the Gnoz can be increased, and the flow amount ratio η can be an appropriate value according to the increase in cooling load.

In contrast, when the cooling load is decreased, the spring constant of the shape memory spring 19d decreases like the first embodiment, so that the needle 19b is moved to shrink the nozzle passage area Anoz. That is, a decrease in area ratio α leads to a decrease in Gnoz. As a result, the flow amount ratio α can be set at the appropriate value.

In this embodiment, the nozzle passage area Anoz can be enlarged or reduced according to the increase or decrease in cooling load, whereby the flow amount ratio η can be changed to the appropriate value. As a result, even when the cooling load is changed, the cycle can be operated with a high cycle efficiency.

Third Embodiment

Figure 7:
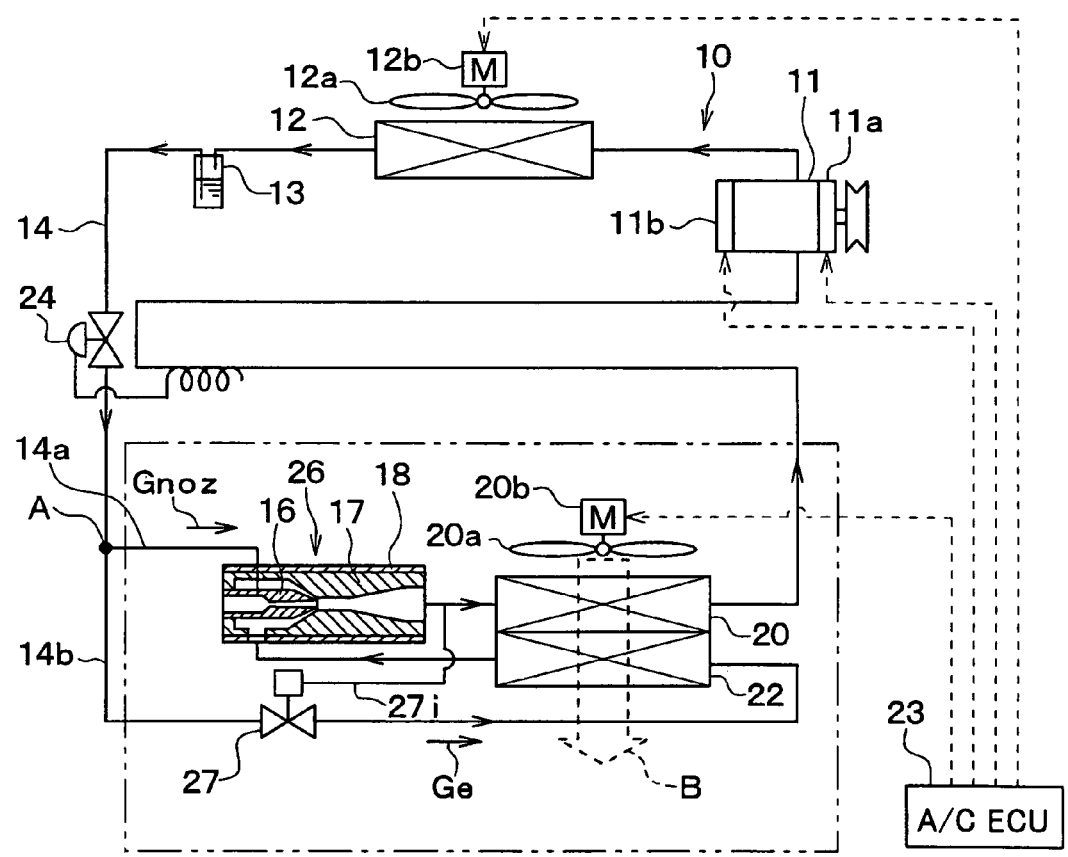
FIG. 7 is a schematic diagram showing an ejector refrigerant cycle system according to a third embodiment of the present invention.
Figure 8:
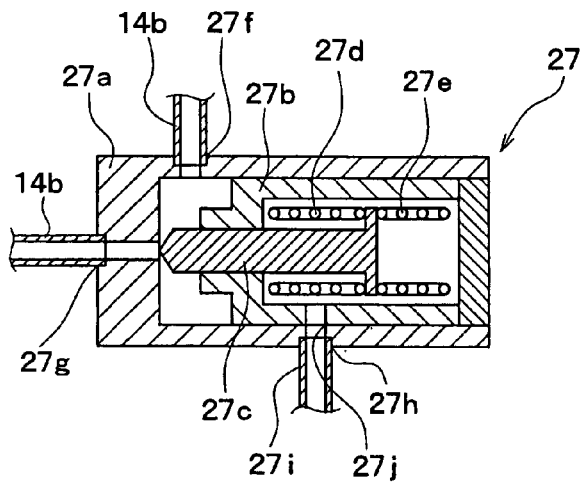
FIG. 8 is a sectional view showing a variable throttle according to the third embodiment.

The third embodiment of the present invention will be now described with reference to FIGS. 7 and 8.

The above-described second embodiment employs the ejector 15 which includes the passage area adjusting mechanism 19 adapted to change the nozzle passage area Anoz according to the change in refrigerant temperature inside the cycle as in the first embodiment. In this embodiment, however, an ejector 26 not employing the passage area adjusting mechanism 19 of the first embodiment is employed as shown in FIG. 7. Thus, the nozzle passage area Anoz of the nozzle portion 16 of the embodiment is not changed.

Figure 6:
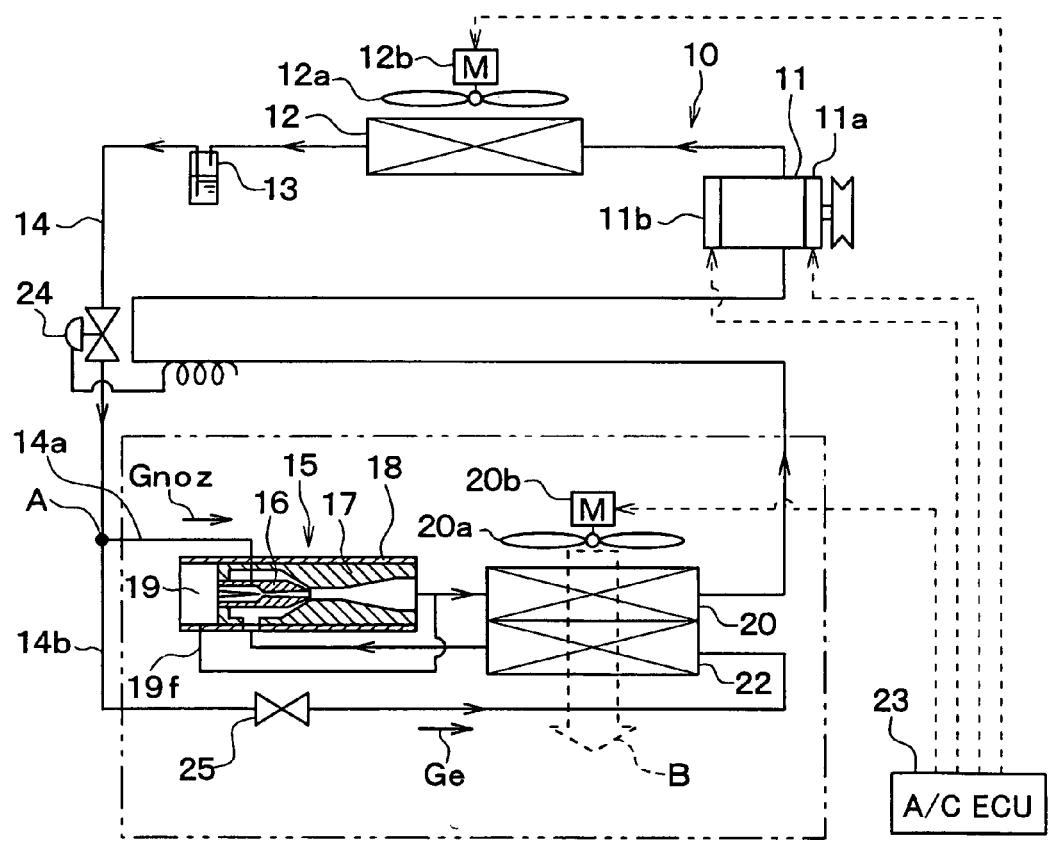
FIG. 6 is a schematic diagram showing an ejector refrigerant cycle system according to a second embodiment of the present invention.

Furthermore, instead of the fixed throttle 25 of the second embodiment, a variable throttle 27 is employed for varying the refrigerant passage area Ae (throttle passage area) according to the change in refrigerant temperature in the cycle, as compared with the cycle structure of FIG. 6. The details of the variable throttle 27 will be explained below with reference to FIG. 8. FIG. 8 is a sectional view of the variable throttle 27.

The variable throttle 27 serves as decompression means for decompressing the refrigerant and adjusting the flow amount of the refrigerant, and includes a housing portion 27aa body portion 27b, a needle portion 27c, a bias spring 27d and a shape memory spring 27e. The housing portion 27a has a substantially cylindrical shape, and serves to fix and protect components of the variable throttle 27.

The housing portion 27a is provided with a high-pressure refrigerant inlet 27f for allowing the refrigerant to flow from the branch piping 14b into the housing portion 27a a refrigerant outlet 27g for allowing the refrigerant to flow from the inside of the housing portion 27a to the second evaporator 22 via the branch piping 14b in the same manner as above, and a refrigerant communication port 27h for communicating the refrigerant on the outlet side of the diffuser portion 17d with a space within the variable throttle 27 for arranging the shape memory spring 27e.

The housing portion 27a is made of the same material (for example, aluminum) as that of each refrigerant piping 14b and the like connected to each of the refrigerant inlets and outlets 27f to 27h. These refrigerant piping 14b and the like are brazed to respective connection parts so as to prevent a leakage of the refrigerant from the connection parts.

The body portion 27b slidably supports the needle portion 27c in the longitudinal direction of the variable throttle 27, while accommodating therein the bias spring 27d and the shape memory spring 27e, and is fixed to the inside of the housing portion 27a. The body portion 27b is provided with a refrigerant communication hole 27j for communicating the refrigerant on the outlet side of the diffuser portion 17d with the space for accommodating therein the shape memory spring 27e via a refrigerant communication piping 27i and a refrigerant communication port 27h of the housing 27a.

The needle portion 27c has the same structure as that of the needle portion 19b of the passage area adjusting mechanism 19 of the above-described first embodiment. The needle portion 27c is disposed axially such that the axis in the longitudinal direction of the needle portion 27c conforms to the axis of the refrigerant outlet 27g of the housing portion 27a. Thus, a clearance between the tip end of the needle portion 27c and the refrigerant outlet 27g constitutes a refrigerant passage for the refrigerant flowing from the refrigerant outlet 27g. The movement of the needle portion 27c changes the area Ae of the refrigerant passage in the variable throttle 27.

Also, the needle portion 27c is constructed with a disk-like spring bearing, which receives the loads of the bias spring 27d and the shape memory spring 27e. The bias spring 27d and the shape memory spring 27e have the same structures as those of the bias spring 19c and the shape memory spring 19d of the above-described first embodiment.

In the third embodiment, the bias spring 27d applies a load to the spring bearing of the needle portion 27c in the direction that moves the needle portion 27c away from the refrigerant outlet 27g, that is, in the direction that enlarges the refrigerant passage area Ae. In contrast, the shape memory spring 27e applies a load to the spring bearing of the needle portion 27c in the direction that causes the needle portion 27c to approach the refrigerant outlet 27g, that is, in the direction that reduces the refrigerant passage area Ae.

Also, in the third embodiment, the space of the body portion 27b for accommodating the shape memory spring 27e is in communication with the refrigerant on the outlet side of the diffuser portion 17d via the refrigerant communication port 27h of the housing portion 27a and the refrigerant communication hole 27j of the body portion 27a. Thus, the shape memory spring 19d is deformed so as to shrink the refrigerant passage area Ae with the increase in temperature of the refrigerant on the outlet side of the diffuser portion 17d, and to enlarge the refrigerant passage area Ae with the decrease in temperature of the refrigerant.

According to the third embodiment, the refrigerant temperature in the cycle, to be communicated with the space of the body portion 27b, corresponds to the temperature of refrigerant on the outlet side of the diffuser portion 17d, the shape memory spring 27e serves as a temperature-sensitive deformation member, and the variable throttle 27 serves as throttle means as well as the flow amount adjusting mechanism. Also, in the third embodiment, the flow amount ratio η is adjusted under a predetermined cooling load to a value that can exert the high cycle efficiency in the whole cycle.

Other components of the third embodiment have the same structures as those of the second embodiment. In FIG. 7, the same reference numerals will be used to refer to parts having the same or equivalent functions as those in the entire configuration diagram (FIG. 6) of the second embodiment. A part enclosed by an alternate long and two short dashes line in FIG. 7 constitutes a refrigerant flow-amount controlling device of the third embodiment.

When the ejector refrigerant cycle system of the third embodiment with the above-mentioned structure is operated, the components of the cycle are operated in the same manner as in the second embodiment. When the cooling load is increased, the temperature of the refrigerant on the outlet side of the diffuser portion 17d also increases like the first embodiment, thereby resulting in an increase in spring constant of the shape memory spring 27e of the variable throttle 27 to shrink the refrigerant passage area Ae (throttle passage area).

When the refrigerant passage area Ae of the variable throttle 27 is reduced, no change occurs in the nozzle passage area Anoz of the nozzle portion 16, so that the Gnoz can be increased. In contrast, when the cooling load is decreased, the spring constant of the shape memory spring 27e decreases and thus the refrigerant passage area Ae of. the variable throttle 27 is enlarged. The enlargement of the refrigerant passage area Ae of the variable throttle 27 leads to a decrease in the nozzle passage area Gnoz. Therefore, the refrigerant passage area Ae of the variable throttle 27 is enlarged or reduced according to the increase or decrease in cooling load, whereby the flow amount ratio η can be changed to an appropriate value. As a result, the same effect as the second embodiment can be obtained in the third embodiment.

Fourth Embodiment

Figure 9:
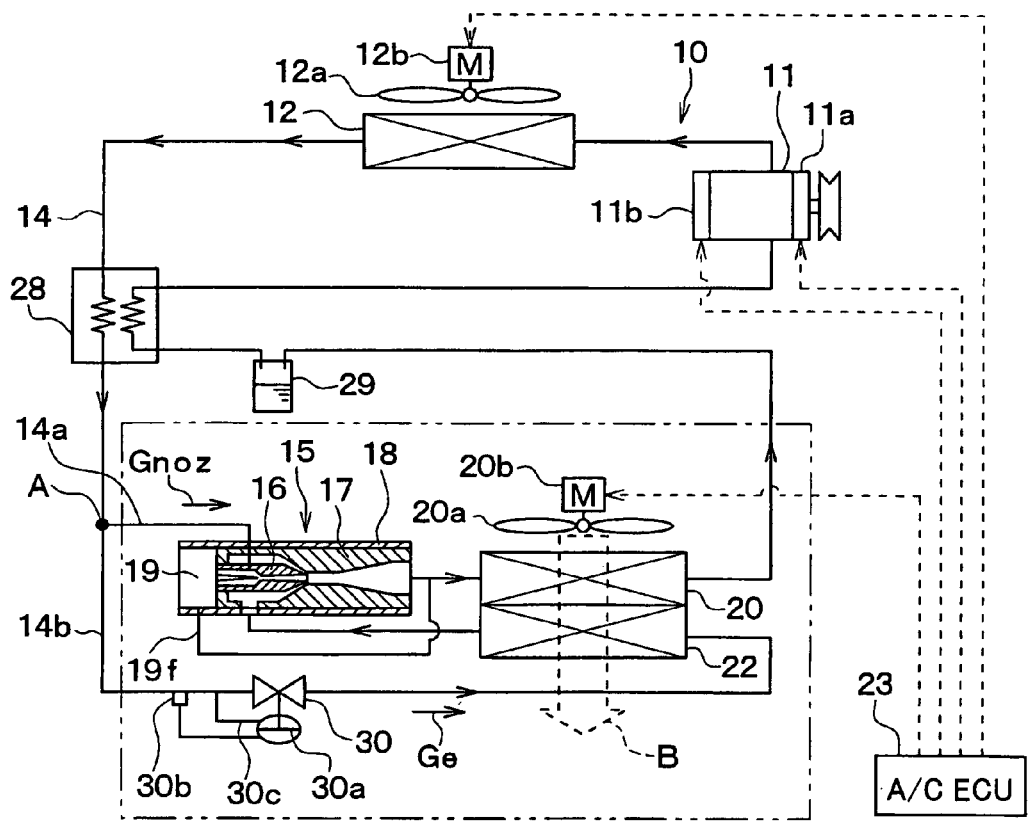
FIG. 9 is a schematic diagram showing an ejector refrigerant cycle system according to a fourth embodiment of the present invention.

FIG. 9 shows the entire structure of an ejector refrigerant cycle system of the fourth embodiment. In this embodiment, carbon dioxide is employed as refrigerant, and the compressor 11 compresses the refrigerant until the high-pressure side refrigerant pressure is equal to or higher than the critical pressure of the refrigerant. Thus, the ejector refrigerant cycle system of the embodiment constitutes a supercritical cycle, wherein the refrigerant is not condensed by the radiator 12. In this case, the radiator 12 is used as a gas cooler.

Furthermore, an inner heat exchanger 28 is disposed on the downstream side of the radiator 12. The inner heat exchanger 28 exchanges heat between the refrigerant flowing from the radiator 12 and the refrigerant to be sucked into the compressor 11 thereby to radiate the heat of the refrigerant flowing from the radiator 12. This increases a difference in enthalpy of the refrigerant between the refrigerant inlet and outlet of each of the first and second evaporators 20 and 22, thereby increasing the refrigeration capacity of the cycle in the ejector refrigerant cycle system.

The refrigerant piping 14 is connected to the inner heat exchanger 28, and the branch portion A for branching the refrigerant flow is disposed in the refrigerant piping 14 at a downstream side of the inner heat exchanger 28, in the same manner as in the first embodiment. One refrigerant branched by the branch portion A flows into the nozzle portion 16 of the ejector 15 via the refrigerant piping 14a, and the other refrigerant branched by the branch portion A flows toward the refrigerant suction port 17b of the ejector 15 via the branch piping 14b. Thus, in the embodiment, the receiver 13 is not provided.

Furthermore, in fourth the embodiment, an accumulator 29 is connected to the downstream side of the first evaporator 20. The accumulator 29 is formed in the shape of a tank, and is a vapor/liquid separating unit for separating the refrigerant in a vapor and liquid mixed state on the downstream side of the first evaporator 20, into vapor-phase refrigerant and liquid-phase refrigerant by a difference in density. Thus, the vapor-phase refrigerant is collected on the upper side of the inner space shaped like a tank of the accumulator 29 in the vertical direction, whereas the liquid-phase refrigerant is collected on the lower side in the vertical direction thereof.

Furthermore, a vapor-phase refrigerant outlet is provided in the top of the tank-shaped accumulator 29. The vapor-phase refrigerant outlet is connected to a low-pressure refrigerant passage of the inner heat exchanger 28, which has the refrigerant outlet side connected to the suction side of the compressor 11.

Moreover, in the fourth embodiment, the thermal expansion valve 21 of the above-described first embodiment is omitted, and a high-pressure control valve 30 is employed. The high-pressure control valve 30 is a mechanical variable throttle mechanism. And, the high-pressure control valve 30 is designed to adjust the refrigerant passage area Ae of its valve body portion (not shown) according to the temperature of the high-pressure refrigerant on the downstream side of the inner heat exchanger 28, thereby adjusting the pressure of the high-pressure refrigerant on the downstream side of the inner heat exchanger 28 into a predetermined range. In addition, the high-pressure control valve 30 is to decompress and expand the refrigerant passing through the high-pressure control valve 30 (refrigerant flowing into the second evaporator 22).

More specifically, the valve body of the high-pressure control valve 30 is connected to a diaphragm mechanism 30a serving as a pressure response mechanism, and the diaphragm mechanism 30a displaces the valve body in accordance with the pressure of fillar gas media of a temperature-sensitive cylinder 30b (i.e., pressure according to the temperature of the high-pressure refrigerant on the downstream side of the inner heat exchanger 28) and the pressure of the high-pressure refrigerant on the downstream side of the high-pressure refrigerant passage of the inner heat exchanger 28 which is introduced into an equalizing pipe 30c, thereby adjusting the opening degree of the valve body. Thus, the high-pressure control valve 30 also constitutes the throttle means of the fourth embodiment.

Also, even in the fourth embodiment, the flow amount ratio η can be adjusted under a predetermined cooling load so as to exert the high cycle efficiency as a whole of the cycle. Other components of this embodiment have the same structures as those of the first embodiment. In FIG. 9, the same reference numerals will be used to refer to parts having the same or equivalent functions as those in the entire configuration diagram of the first embodiment (see FIG. 1). A part enclosed by an alternate long and two short dashes line in FIG. 9 constitutes a refrigerant flow-amount controlling device of this embodiment.

Additionally, in the embodiment, even when the nozzle passage area Anoz of the nozzle portion 16 of the ejector 15 and the refrigerant passage area Ae of the valve body portion of the high-pressure control valve 30 are minimum, the nozzle portion 16 and the valve body are configured to allow a predetermined flow amount of refrigerant to pass therethrough. In other words, the nozzle portion 16 of the ejector 15 and the valve body portion of the high-pressure control valve 30 are configured not to be closed completely.

In the ejector refrigerant cycle system 10 of the fourth embodiment, the refrigerant can surely be branched and supplied into the ejector 15 side and the high-pressure control valve 30 side. This structure can be achieved easily, for example, by providing an alignment portion in the needle portion 19b of the passage area adjusting mechanism 19 to restrict the movable area of the needle portion, and by restricting the movable area of the valve body of the high-pressure control valve 30.

When the ejector refrigerant cycle system of the fourth embodiment with the above-mentioned structure is activated, the compressor 11 is operated to increase the pressure of the refrigerant up to or above the supercritical pressure, and then the refrigerant is discharged from the compressor 11. The heat of the high-pressure refrigerant discharged from the compressor 11 is radiated via the radiator 12 and the inner heat exchanger 28 in that order, so that the enthalpy of the high-pressure refrigerant is decreased. And, the refrigerant is divided into the refrigerant piping 14a side and the branch piping 14b side from the branch portion A.

The above-mentioned high-pressure refrigerant has its pressure adjusted to a predetermined value by the described high-pressure control valve 30 disposed in the branch piping 14b. Specifically, the pressure of the high-pressure refrigerant is adjusted to a high pressure that makes the cycle efficiency (COP) maximum according to the temperature of the refrigerant on the outlet side of the inner heat exchanger 28. Since the power consumption of the compressor 11 is large in a cycle having the high-pressure side refrigerant pressure above the critical pressure, like the cycle of this embodiment, such control of the pressure of the high-pressure side refrigerant can improve the cycle efficiency greatly.

The refrigerant having passed from the branch portion A into the refrigerant piping 14a is decompressed and expanded by the nozzle portion 16, like the first embodiment, is mixed with the refrigerant sucked into the refrigerant suction port 17b after absorbing heat at the second evaporator 22 in the mixing portion 17c, and then has its pressure increased by the diffuser portion 17d. Thereafter, the refrigerant flows into the first evaporator 20 from the diffuser portion 17d.

The refrigerant flowing into the first evaporator 20 exerts the heat absorbing action at the first evaporator 20 and then flows into the accumulator 29. The refrigerant flowing into the accumulator 29 is divided into vapor-phase refrigerant and liquid-phase refrigerant, and the vapor-phase refrigerant to be sucked into the compressor 11 exchanges heat with the high-pressure refrigerant on the downstream side of the radiator 12 in the inner heat exchanger 28.

In contrast, the refrigerant branched from the branch portion A into the branch piping 14b is decompressed by the high-pressure control valve 30 to flow into the second evaporator 22. The refrigerant exerts the heat absorbing action at the second evaporator 22 to be sucked into the refrigerant suction port 17b of the ejector 15 and is mixed with the liquid-phase refrigerant having passed through the nozzle portion 16 in the mixing portion 17c. The mixed refrigerant passes through the diffuser portion so as to flow into the first evaporator 20. Thus, even the operation of the ejector refrigerant cycle system of this embodiment can obtain the same effect as that of the first embodiment.

According to the ejector refrigerant cycle system of the fourth embodiment, since the high-pressure side refrigerant pressure is controlled based on the high-pressure side refrigerant temperature, the cycle efficiency in the supercritical cycle can be improved. Moreover, the refrigeration capacity of the cycle is increased by the inner heat exchanger 28, thereby further improving the cycle efficiency.

For example, in the fourth embodiment, when the temperature of air that exchanges heat with the refrigerant at the radiator 12 is increased to increase the cooling load, the temperature of the high-pressure refrigerant on the downstream side of the radiator 12 (specifically, on the downstream side of the inner heat exchanger 28) is increased. Thus, the high-pressure control valve 30 changes the refrigerant passage Ae based on the increase in temperature of the high-pressure refrigerant.

In this case, since the cooling load is increased, the refrigerant passage Ae of the high-pressure control valve 30 is enlarged to increase the flow amount of the refrigerant passing through the high-pressure control valve 30. Furthermore, in the embodiment, the increase in cooling load increases the temperature of the refrigerant on the outlet side of the diffuser portion 17d like the first embodiment, which increases the spring constant of the shape memory spring 19d to increase the nozzle passage area Anoz.

In contrast, when the cooling load is decreased, the high-pressure control valve 30 reduces the refrigerant passage area Ae to decrease the flow amount of the refrigerant passing through the high-pressure control valve 30. Also, the temperature of the refrigerant on the outlet side of the diffuser portion 17d is lowered, which decreases the spring constant of the shape memory spring 19d to reduce the nozzle passage area Anoz.

In other words, the refrigerant passage area Ae of the valve 30 and the nozzle passage area Anoz are simultaneously enlarged or reduced according to the increase or decrease in cooling load, and hence the flow amount ratio η is maintained to an appropriate value. As a result, even when the cooling load is changed, the cycle can be operated with the high cycle efficiency.

Fifth Embodiment

The fifth embodiment of the present invention will be now described with reference to FIGS. 10 and 11.

Figure 10:
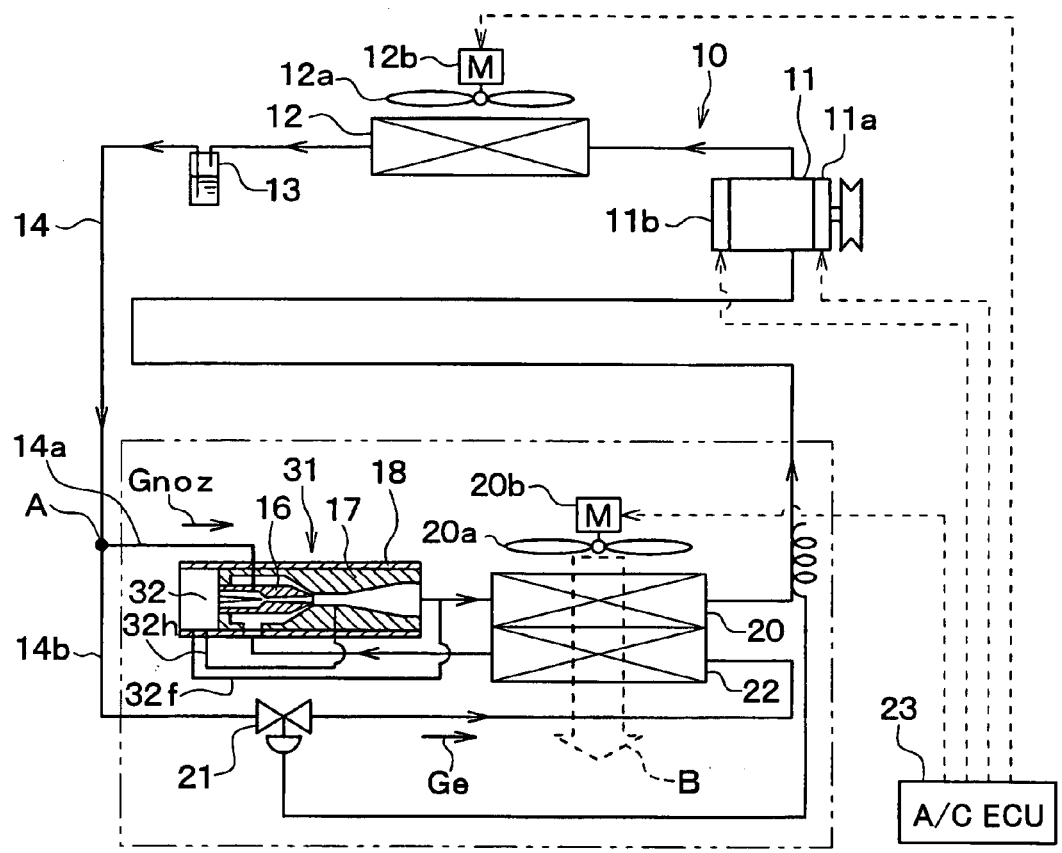
FIG. 10 is a schematic diagram showing an ejector refrigerant cycle system according to a fifth embodiment of the present invention.
Figure 11:
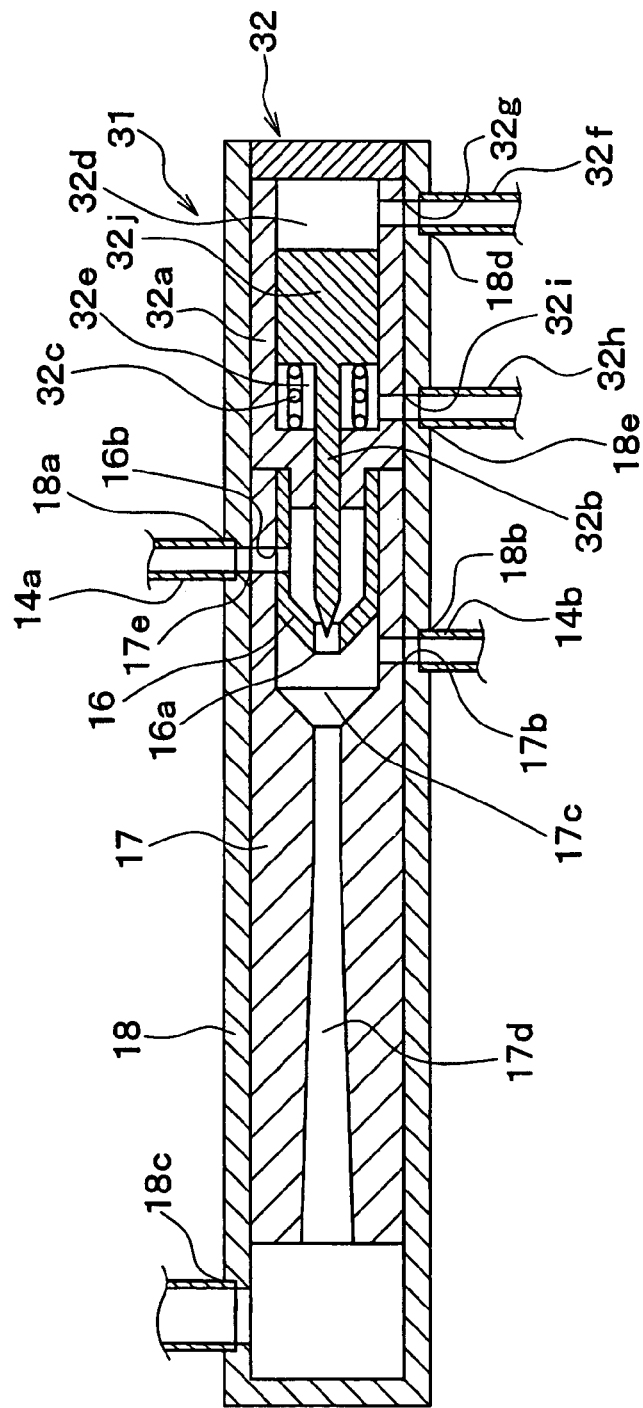
FIG. 11 is a sectional view showing an ejector according to the fifth embodiment.

In the fifth embodiment, instead of the ejector 15 of the first embodiment, an ejector 31 is employed as shown in FIG. 10. The ejector 31 can change the nozzle passage area Anoz of the nozzle portion 16 by an increased amount of pressure ΔP, which is a difference in pressure between the refrigerant on the outlet side of the diffuser portion 17d and the refrigerant on the inlet side of the diffuser portion 17d.

The structure of the ejector 31 will be described below with reference to the sectional view of FIG. 11. The basic structure of the ejector 31 is similar to that of the ejector 15 (see FIG. 2) of the first embodiment, and hence the same reference numerals will be used to refer to parts having the same or equivalent functions as those in the entire configuration diagram of the first embodiment.

The ejector 31 includes the nozzle portion 16, the ejector body 17, the ejector housing 18, and a passage area adjusting mechanism 32. The nozzle portion 16 and the ejector body 17 of the ejector 31 have the same structure as those in the ejector 15 of the first embodiment.

In addition to the inlets and outlets 18a to 18d of the first embodiment, the ejector housing 18 is provided with a refrigerant communication port 18e for setting communication between the inside of the passage area adjusting mechanism 32 and the refrigerant on the inlet side of the diffuser portion 17d.

The passage area adjusting mechanism 32 includes a body portion 32a, a needle portion 32b and a bias spring 32c. The body portion 32a slidably supports the needle portion 32b in the longitudinal direction of the ejector 31, and accommodates therein the bias spring 32c. In the body portion 32a are disposed an outlet side pressure chamber 32d adapted for communicating with the refrigerant on the outlet side of the diffuser portion 17d, and an inlet side pressure chamber 32e adapted for communicating with the refrigerant on the inlet side of the diffuser portion 17d.

Furthermore, the body portion 32b includes a refrigerant communication hole 32g for communicating the refrigerant on the outlet side of the diffuser portion 17d with the outlet side pressure chamber 32d via a refrigerant communication piping 32f and the refrigerant communication port 18d of the ejector housing 18, and a refrigerant communication hole 32i for communicating the refrigerant on the inlet side of the diffuser portion 17d with the inlet side pressure chamber 32e via a refrigerant communication piping 32h and the refrigerant communication port 18e of the ejector housing 18.

The needle portion 32b has the same structure as that of the needle portion 19b of the first embodiment, and the nozzle passage area Anoz of the nozzle portion 16 is formed in the same manner as that of the first embodiment. Furthermore, the needle portion 32b includes a cylinder portion 32j for partitioning the inside space of the body portion 32a into the outlet side pressure chamber 32d and the inlet side pressure chamber 32e.

The surface of the cylinder portion 32j on the side of the inlet side pressure chamber 32e serves as a pressure receiver for receiving the load of the bias spring 32c and the pressure of the inlet side pressure chamber 32e (that is, the refrigerant pressure on the inlet side of the diffuser portion 17d), and the surface of the cylinder portion 32j on the outlet side pressure chamber 32d side serves as another pressure receiver for receiving the pressure of the outlet side pressure chamber 32d (that is, the refrigerant pressure on the outlet side of the diffuser portion 17d).

Also, because the needle portion 32b of the fifth embodiment is supported slidably by the body portion 32a, there is provided a clearance in a sliding part between the cylinder portion 32j and the inner surface of the body portion 32a. In the embodiment, the distance of the sliding part (the length of the seal) is sufficiently ensured to prevent a leakage of the refrigerant from the sliding part.

In order to prevent the leakage of the refrigerant from the sliding part, means for constituting a labyrinth seal on the side of the cylinder portion 32j, or means for arranging an O-ring in the sliding part between the cylinder portion 32*j* and the body portion 32*a* may be employed.

The bias spring 32*c* has the same structure as that of the bias spring 19*c* of the first embodiment, and is designed to apply a load to the cylinder portion 32*j* of the needle portion 32*b* in the direction that moves the needle portion 32*b* away from the refrigerant ejection port 16*a* of the nozzle portion 16, that is, in the direction that enlarges the nozzle passage area Anoz.

According to the fifth embodiment, when the increased amount of pressure ΔP at the diffuser portion 17*d* becomes the predetermined value, the flow amount ratio η can be adjusted to the appropriate value so as to exert the high cycle efficiency in the whole cycle. Other components of this embodiment have the same structures as those of the first embodiment.

Thus, the operation of the ejector refrigerant cycle system of this embodiment can obtain the same effect as that of the first embodiment. Furthermore, according to the ejector refrigerant cycle system of the fifth embodiment, when the increased amount of pressure ΔP at the diffuser portion 17*d* of the ejector 31 is increased, the refrigerant pressure of the outlet side pressure chamber 32*d* is increased with respect to the refrigerant pressure of the inlet side pressure chamber 32*e*.

For this reason, the load directed from the outlet side pressure chamber 32*d* side to the inlet side pressure chamber 32*e* side is increased among the loads received by the pressure receiver of the cylinder portion 32*j* of the needle portion 32*b*. This displaces the needle portion 32*b* in the direction that reduces the nozzle passage area Anoz. As the nozzle passage area Anoz is reduced, the Gnoz is decreased, resulting in an increase in Ge. When the Ge is increased, the increased amount of pressure ΔP at the diffuser portion 17*d* decreases to approach a predetermined value, whereby the flow amount ratio η approaches the appropriate value as mentioned above.

On the other hand, when the increased amount of pressure ΔP at the diffuser portion 17*d* decreases, the load directed from the outlet side pressure chamber 32*d* side to the inlet side pressure chamber 32*e* is decreased among the loads received by the pressure receiver of the cylinder 32*j*. This displaces the needle portion 32*b* in the direction that enlarges the nozzle passage area Anoz. As the nozzle passage area Anoz is enlarged, the Gnoz is increased, resulting in a decrease in Ge. When the Ge is decreased, the increased amount of pressure ΔP increases to approach the predetermined value, whereby the flow amount ratio η approaches the appropriate value.

According to the fifth embodiment, the nozzle passage area Anoz is increased or decreased according to the increase or decrease in the increased amount of pressure ΔP at the diffuser portion 17*d*, whereby the flow amount ratio η can be changed to the appropriate value, and hence the cycle can be operated with the high cycle efficiency.

Sixth Embodiment

The sixth embodiment of the present invention will be now described with reference to FIG. 12.

Figure 12:
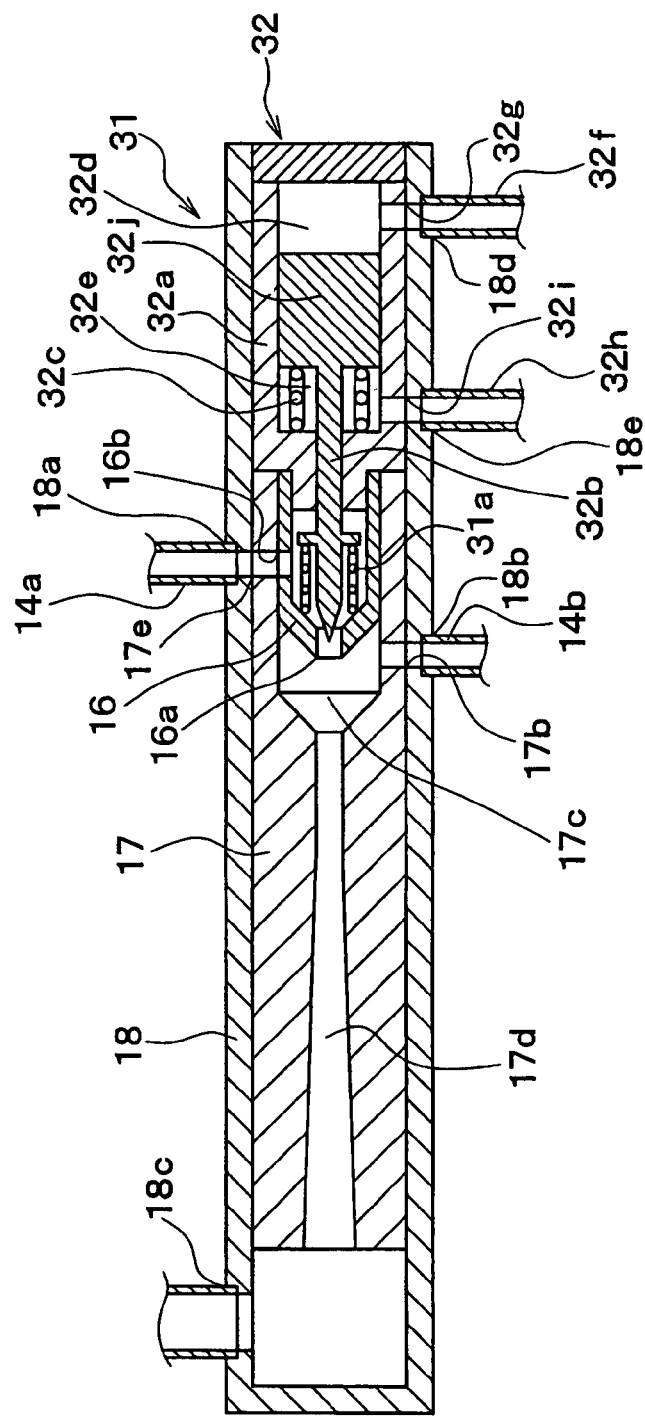
FIG. 12 is a sectional view showing an ejector according to a sixth embodiment of the present invention.

In the sixth embodiment, a shape memory spring 31*a* is added to the ejector 31 of the fifth embodiment as shown in the sectional view of FIG. 12. This shape memory spring 31*a* applies a load to a spring bearing of the needle portion 32*b* constructed in the nozzle portion 16.

The shape memory spring 31*a* has the same structure as that of the shape memory spring 19*d* of the first embodiment. Thus, the shape memory spring 31*a* is deformed to extend in the axial direction with the increase in temperature. For this reason, the needle portion 32*a* is displaced in the direction away from the refrigerant ejection port 16*a* with the increase in temperature of the refrigerant, that is, in the direction that enlarges the nozzle passage area Anoz.

Furthermore, the shape memory spring 31*a* is disposed within the nozzle portion 16, and thus is deformed according to a change in temperature of the refrigerant flowing from the refrigerant passage 14*a* into the nozzle portion 16. Other components of this embodiment have the same structures as those of the above-described fifth embodiment. Therefore, the ejector refrigerant cycle system of this embodiment is operated to obtain the same effect as that of the fifth embodiment.

According to the ejector refrigerant cycle system of the sixth embodiment, since the shape memory spring 31*a* is disposed in the nozzle portion 16*a* the increase in temperature of the refrigerant flowing from the refrigerant passage 14*a* into the nozzle portion 16 can enlarge the nozzle passage area Anoz.

For example, when the temperature of air that exchanges heat with the radiator 12 is increased to increase the cooling load, the thermal expansion valve 21 enlarges the refrigerant passage area Ae therein to increase the refrigerant flow amount. The increase in temperature of the air for exchanging heat with the radiator 12 leads to an increase in temperature of the refrigerant on the downstream side of the radiator 12, resulting in increased temperature of the refrigerant flowing from the refrigerant passage 14*a* into the nozzle portion 16. Thus, in this case, the shape memory spring 31*a* enlarges the nozzle passage area Anoz.

In contrast, when the temperature of air that exchanges heat with the radiator 12 is decreased to decrease the cooling load, the thermal expansion valve 21 reduces the refrigerant passage area Ae to decrease the refrigerant flow amount. The decrease in temperature of the air for exchanging heat with the radiator 12 also leads to a decrease in temperature of the refrigerant flowing from the refrigerant passage 14*a* into the nozzle portion 16, whereby the shape memory spring 31*a* reduces the nozzle passage area Anoz.

According to the sixth embodiment of the present invention, the refrigerant passage area Ae of the thermal expansion valve 21 and the nozzle passage area Anoz are simultaneously enlarged or reduced according to the increase or decrease in cooling load, whereby the flow amount ratio η is maintained to an appropriate value. As a result, even when the cooling load is changed in the ejector refrigerant cycle system, the cycle can be operated with a high cycle efficiency.

Seventh Embodiment

The seventh embodiment of the present invention will be now described with reference to FIG. 13.

Figure 13:
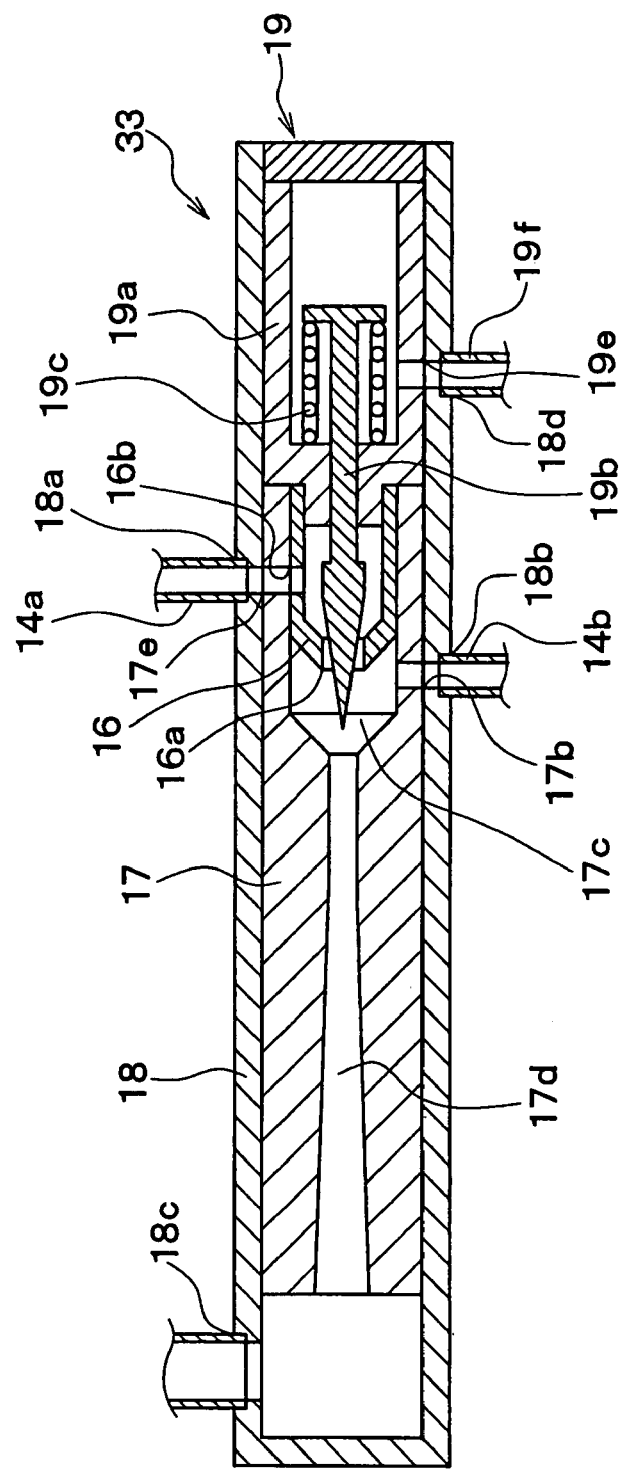
FIG. 13 is a sectional view showing an ejector according to a seventh embodiment of the present invention.

In the seventh embodiment, instead of the ejector 31 of the fifth embodiment, an ejector 33 shown in FIG. 13 is used. FIG. 13 is a sectional view of the ejector 33. The ejector 33 has the basic structure similar to that of the ejector 15 of the first embodiment (see FIG. 2), and hence the same reference numerals will be used to refer to parts having the same or equivalent functions.

The ejector 33 includes the nozzle portion 16, the ejector body 17, the ejector housing 18 and the passage area adjusting mechanism 19. The nozzle portion 16, the ejector body 17 and the ejector housing 18 have the same structures as those of the ejector 15 of the above-described first embodiment.

In the passage area adjusting mechanism 19 of the seventh embodiment, as compared with the structure of the first embodiment, the shape memory spring 19*d* shown in FIG. 2 is not provided, and the bias spring 19*c* is adapted to apply a load to a spring bearing of the needle portion 19b in the direction that moves the needle portion 19b away from the refrigerant ejection port 16a of the nozzle portion 16, that is, in the direction that enlarges the nozzle passage area Anoz.

The tip end of the needle portion 19b on the nozzle portion 16 side protrudes from the refrigerant ejection port 16a of the nozzle portion 16 toward the diffuser portion 17d side, and the protruding part receives the pressure of the refrigerant on the inlet side of the diffuser portion 17d. On the other hand, the section perpendicular to the axial direction of the needle portion 19b at the sliding part between the needle portion 19b and the body portion 19a has the same area as that of the section perpendicular to the axial direction of the above-mentioned protruding part.

Furthermore, according to the seventh embodiment, when the increased amount of pressure ΔP at the diffuser portion 17d reaches the predetermined value, the flow amount ratio η can be adjusted to a value that can exert the high cycle efficiency in the whole cycle. Other components of this embodiment have the same structures as those of the first embodiment.

Thus, the operation of the ejector refrigerant cycle system of this embodiment can obtain the same effect as that of the fifth embodiment. Specifically, when the increased amount of pressure ΔP at the diffuser portion 17d of the ejector 33 increases, the refrigerant pressure inside the body portion 19a is increased with respect to the refrigerant pressure at the tip end of the needle portion 19b. Thus, the load directed from the body portion 19a side to the nozzle portion 16 side increases among the loads received by the needle portion 19b.

This displaces the needle portion 32b in the direction that reduces the nozzle passage area Anoz. As the nozzle passage area Anoz is reduced, the Ge increases, and then the increased amount of pressure ΔP decreases to approach a predetermined value, whereby the flow amount ratio η approaches an appropriate value.

On the other hand, when the increased amount of pressure ΔP decreases, the load directed from the body portion 19a side to the nozzle portion 16 side is decreased among the loads received by the needle portion 19b. This displaces the needle portion 32b in the direction that enlarges the nozzle passage area Anoz. As the Anoz enlarges, the Ge decreases, and then the increased amount of pressure ΔP increases to approach the predetermined value, whereby the flow amount ratio η approaches the appropriate value. Thus, this embodiment can obtain the same effect as that of the fifth embodiment.

Eighth Embodiment

Figure 14:
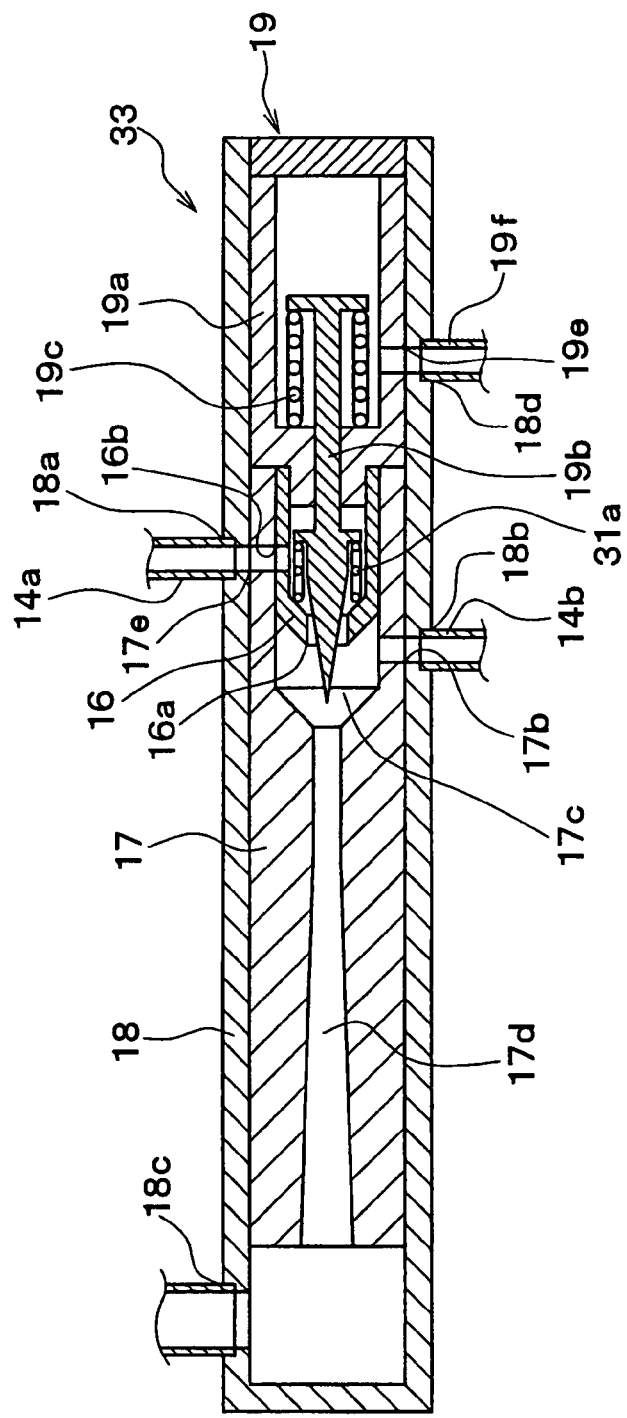
FIG. 14 is a sectional view showing an ejector according to an eighth embodiment of the present invention.

The eighth embodiment of the present invention will be now described with reference to FIG. 14. In the eighth embodiment, the shape memory spring 31a is added to the ejector 33 of the seventh embodiment as shown in the sectional view of FIG. 14. The shape memory spring 31a applies a load to the spring bearing of the needle portion 32b constructed in the needle portion 16 in the same manner as in the sixth embodiment.

Other components have the same structures as those of the sixth embodiment. Thus, the operation of the ejector refrigerant cycle system of this embodiment can obtain the same effect as that of the sixth embodiment.

Other Embodiments

The present invention is not limited to the embodiments described above, and various modifications can be made to the embodiments as follows.

(1) In the above-mentioned first embodiment, the thermal expansion valve 21 can be used as the throttle means on the upstream side of the second evaporator 22 to control the degree of superheat of the refrigerant on the downstream side of the first evaporator 20, and the ejector 15 can change the nozzle passage area Anoz according to the refrigerant temperature in the cycle. Alternatively, the superheat degree of the refrigerant on the downstream side of the first evaporator 20 may be controlled on the ejector side, and the refrigerant passage area Ae may be changed according to the refrigerant temperature in the cycle on the throttle means side.

In the above-described embodiments, for example, the temperature in the cycle is a temperature of low-pressure refrigerant after being decompressed by the nozzle portion 16 or the thermal means (21, 25, 27). However, the temperature in the cycle may be a temperature of high-pressure refrigerant before being decompressed by the nozzle portion 16 or the thermal means.

In this case, specifically, a thermal expansion valve may be adopted between the branch portion A and the nozzle portion 16, or may be applied to the passage area adjusting mechanism 19 of the first embodiment. Furthermore, the throttle means may be configured to displace the valve body portion by use of a shape memory spring to increase the refrigerant passage area according to an increase in temperature of the refrigerant on the outlet side of the diffuser portion 17d, thereby obtaining the same effect as the first embodiment.

(2) In the above-mentioned first to third embodiments, the shape memory springs 19d, 27e constituting the temperature-sensitive deformation member are deformed based on the temperature of the refrigerant on the outlet side of the diffuser portion 17d, but may be deformed based on the temperature of the refrigerant at other portions. For example, the temperature of low-pressure side refrigerant, such as the temperature of the refrigerant on the downstream side of the second evaporator 22, the temperature of the refrigerant on the downstream side of the first evaporator 20, or the temperature of the refrigerant inside the first and second evaporators 20 and 22, may be employed. Furthermore, like the above-mentioned sixth and eight embodiments, the spring may be deformed based on the temperature of high-pressure side refrigerant.

(3) In the above-mentioned second and third embodiments, the ejector 15 and the variable throttle 27 individually changes the nozzle passage area Anoz and the refrigerant passage area Ae according to the refrigerant temperature in the cycle, respectively. However, the ejector 15 and the variable throttle 27 may simultaneously change the nozzle passage area Anoz and the refrigerant passage area Ae according to the refrigerant temperature in the cycle. Moreover, the nozzle passage area Anoz and the refrigerant passage area Ae may be simultaneously changed, while the area ratio α may be controlled to be equal to or below 0.8.

(4) In the above-mentioned fourth embodiment, the high-pressure control valve 30 serving as the throttle means controls the pressure of the refrigerant on the downstream side of the radiator 12, and the ejector 15 adjusts the flow amount ratio η. However, the pressure of the refrigerant on the downstream side of the radiator 12 may be controlled on the ejector side, and the flow amount ratio η may be adjusted on the throttle means side.

For example, the structure of the high-pressure control valve 30 may be applied to the passage area adjusting mechanism 19 of the ejector 15, and the shape memory spring may displace the valve body as the throttle means to increase the refrigerant passage area according to the increase in temperature of the refrigerant on the outlet side of the diffuser portion 17d. This can obtain the same effect as that of the fourth embodiment.

(5) The above-mentioned fifth to eighth embodiments have explained the examples of the cycles in which the pressure of the high-pressure side refrigerant is not equal to or higher than the supercritical pressure of the refrigerant. However, the ejectors 31 and 33 of the fifth to eighth embodiments may be applied to the supercritical cycle. In other words, in the supercritical cycle, the flow amount ratio η may be controlled based on the increased amount of pressure ΔP in the diffuser portion 17d.

(6) Although the refrigerant flow-amount controlling device of the present invention is applied to the ejector refrigerant cycle systems of the above-mentioned first to third and fifth to eighth embodiments without an inner heat exchanger, these cycles may employ the inner heat exchanger. With this arrangement, like the fourth embodiment, a difference in enthalpy of the refrigerant between the refrigerant inlet and outlet at the first and second evaporators 20 and 22 is increased thereby to permit an increase in refrigeration capacity of the cycle.

(7) The thermal expansion valves 21 and 24 and the high-pressure control valve 30 which are employed in the above embodiments have the purely mechanical flow amount controlling mechanism. However, any other flow amount controlling mechanism that can change the refrigerant passage area in an electrical manner may be employed. In this case, for example, the thermal expansion valve 21 may be provided with detection means for detecting the temperature and pressure of the refrigerant on the downstream side of the first evaporator 20, and based on values detected, the superheat degree of the refrigerant on the downstream side of the first evaporator 20 may be controlled to be in a predetermined range.

(8) In the above-mentioned embodiments, the first evaporator 20 and the second evaporator 22 are constructed as an indoor heat exchanger for cooling a space to be cooled, and the radiator 12 is constructed as an outdoor heat exchanger for radiating heat to the outside air. Conversely, the invention may be applied to a heat pump cycle in which the first evaporator 20 and the second evaporator 22 are constructed as the outdoor heat exchanger for absorbing heat from a heat source, such as air or the like, and the radiator 12 is constructed as the indoor heat exchanger for heating a fluid to be heated, such as air or water.

(9) In the above-described embodiments, high-pressure side refrigerant means a refrigerant discharged from the compressor and before being decompressed by the nozzle portion of the ejector or the throttle means. In contrast, low-pressure side refrigerant means a refrigerant after being decompressed by at least one of the nozzle and the throttle means.

Such changes and modifications are to be understood as being within the scope of the present invention as defined by the appended claims.

What is claimed is:

1. A refrigerant flow-amount controlling device for an ejector refrigerant cycle system having a compressor for compressing refrigerant and a radiator for cooling high-temperature high-pressure refrigerant discharged from the compressor, the refrigerant from the radiator being divided at a branch portion into a first stream and a second stream, the refrigerant flow-amount control device comprising:

an ejector having a nozzle portion for decompressing refrigerant of the first stream, and a refrigerant suction port from which refrigerant is drawn by a high-speed flow of refrigerant jetted from the nozzle portion;

a first evaporator for evaporating refrigerant flowing out of the ejector;

a throttle means for decompressing and expanding refrigerant of the second stream;

a second evaporator, disposed downstream of the throttle means and upstream of the refrigerant suction portion, for evaporating refrigerant; and an adjusting mechanism having a temperature-sensitive deformation member that is deformed in accordance with a variation in a refrigerant temperature of the cycle system to adjust one refrigerant passage area of the nozzle portion and the throttle means, wherein the adjusting mechanism is provided to adjust a flow ratio of a first refrigerant flow amount decompressed by the nozzle portion of the ejector and a second refrigerant flow amount drawn into the refrigerant suction port of the ejector.

2. The refrigerant flow-amount control device according to claim 1, wherein the one refrigerant passage area is a refrigerant passage area of the nozzle portion.

3. The refrigerant flow-amount control device according to claim 1, wherein the one refrigerant passage area is a refrigerant passage area of the throttle means.

4. The refrigerant flow-amount control device according to claim 1, wherein the adjusting mechanism changes the one refrigerant passage area, such that a ratio of a refrigerant passage area of the nozzle portion to a total of the refrigerant passage area of the nozzle portion and a refrigerant passage area of the throttle means becomes equal to or below 0.8.

5. The refrigerant flow-amount control device according to claim 1, wherein:

one of the nozzle portion of the ejector and the throttle means changes its refrigerant passage area based on a temperature of refrigerant on a downstream side of the radiator such that a pressure of refrigerant on the downstream side of the radiator approaches a predetermined value.

6. The refrigerant flow-amount control device according to claim 1, wherein:

the ejector further includes a diffuser portion in which the pressure of mixed refrigerant of the refrigerant jetted from the nozzle portion and the refrigerant drawn from the refrigerant suction port is increased by a pressure increasing amount; and the adjusting mechanism adjusts the flow ratio of the first refrigerant flow amount and the second refrigerant flow amount, based on the pressure increasing amount in the diffuser portion of the ejector.

7. The refrigerant flow-amount controlling device according to claim 1, wherein the refrigerant temperature in the cycle system is a temperature of a low-pressure side refrigerant after being decompressed by the nozzle portion or the throttle means.

8. The refrigerant flow-amount controlling device according to claim 1, wherein the refrigerant temperature in the cycle system is a temperature of a high-pressure side refrigerant before being decompressed by at least one of the nozzle portion and the throttle means.

9. The refrigerant flow-amount controlling device according to claim 1, wherein the temperature-sensitive deformation member is a spring member having a spring constant changed in accordance with the refrigerant temperature in the cycle system.

10. The refrigerant flow-amount controlling device according to claim 1, wherein the first evaporator, the second evaporator and the ejector are integrally joined to form an integrated unit.

11. The refrigerant flow-amount controlling device according to claim 10, wherein:
the first evaporator includes a first header tank for distributing and collecting refrigerant;
the second evaporator includes a second header tank for distributing and collecting refrigerant; and
the ejector has a longitudinal direction that is parallel to a longitudinal direction of the first header tank and a longitudinal direction of the second header tank.

12. The refrigerant flow-amount controlling device according to claim 10, wherein:
the ejector further includes an ejector body having the refrigerant suction port, an ejector housing for accommodating the nozzle portion and the ejector body; and
the ejector housing, the first evaporator and the second evaporator are integrally joined.

13. A refrigerant flow-amount controlling device for an ejector refrigerant cycle system having a compressor for compressing refrigerant and a radiator for cooling high-temperature high-pressure refrigerant discharged from the compressor, the refrigerant from the radiator being divided at a branch portion into a first stream and a second stream, the refrigerant flow-amount control device comprising:
an ejector having a nozzle portion for decompressing refrigerant of the first stream, and a refrigerant suction port from which refrigerant is drawn by a high-speed flow of refrigerant jetted from the nozzle portion;
a first evaporator for evaporating refrigerant flowing out of the ejector;
a throttle means for decompressing and expanding refrigerant of the second stream; and
a second evaporator, disposed downstream of the throttle means and upstream of the refrigerant suction portion, for evaporating refrigerant, wherein
one of the ejector and the throttle means adjusts its refrigerant passage area based on a temperature of refrigerant on a downstream side of the radiator such that a pressure of refrigerant on the downstream side of the radiator approaches a predetermined value, and
the other one of the ejector and the throttle means has a temperature-sensitive deformation member that changes a refrigerant passage area of the other one thereof to adjust a flow ratio of a first refrigerant flow amount decompressed by the nozzle portion of the ejector and a second refrigerant flow amount drawn into the refrigerant suction port of the ejector.

14. The refrigerant flow-amount controlling device according to claim 13, wherein the refrigerant discharged from the compressor is equal to or higher than a critical pressure of the refrigerant.

15. The refrigerant flow-amount controlling device according to claim 14, wherein the refrigerant is carbon dioxide.

16. The refrigerant flow-amount controlling device according to claim 13, wherein one of the ejector and the throttle means adjusts its refrigerant passage area based on a temperature of refrigerant on a downstream side of a passage of an inner heat exchanger, in which the refrigerant from the radiator flows to perform heat exchange with low-pressure refrigerant to be drawn into the compressor.

17. The refrigerant flow-amount controlling device according to claim 13, wherein at least one of the ejector and the throttle means is constructed such that refrigerant passes therethrough by a predetermined amount when its refrigerant passage area becomes smallest.

18. A refrigerant flow-amount controlling device for an ejector refrigerant cycle system having a compressor for compressing refrigerant and a radiator for cooling high-temperature high-pressure refrigerant discharged from the compressor, the refrigerant from the radiator being divided at a branch portion into a first stream and a second stream, the refrigerant flow-amount control device comprising:
an ejector having a nozzle portion for decompressing refrigerant of the first stream, a refrigerant suction port from which refrigerant is drawn by a high-speed flow of refrigerant jetted from the nozzle portion, a diffuser portion in which the pressure of mixed refrigerant of the refrigerant jetted from the nozzle portion and the refrigerant drawn from the refrigerant suction port is increased by a pressure increasing amount;
a first evaporator for evaporating refrigerant flowing out of the ejector;
a throttle means for decompressing and expanding refrigerant of the second stream;
a second evaporator, disposed downstream of the throttle means and upstream of the refrigerant suction portion, for evaporating refrigerant; and
adjusting means for adjusting a flow ratio of a first refrigerant flow amount flowing into the nozzle portion and a second refrigerant flow amount drawn into the refrigerant suction port, based on the pressure increasing amount in the diffuser portion of the ejector.

19. The refrigerant flow-amount controlling device according to claim 18, wherein the adjusting means is provided in the throttle means.

20. The refrigerant flow-amount controlling device according to claim 18, wherein the adjusting means is provided in the ejector.

21. The refrigerant flow-amount controlling device according to claim 20, wherein:
the ejector includes a needle portion for changing a refrigerant passage area of the nozzle portion; and
the needle portion is displaced based on the pressure increasing amount such that the pressure increasing amount becomes in a predetermined range.

22. The refrigerant flow-amount controlling device according to claim 21, wherein the needle portion has a pressure receiving portion which receives a refrigerant pressure at an inlet side of the diffuser portion and a refrigerant pressure at an outlet side of the diffuser portion.

23. The refrigerant flow-amount controlling device according to claim 21, wherein:
the ejector includes a temperature-sensitive deformation member that is deformed in accordance with a variation in a refrigerant temperature of the cycle system; and
the temperature-sensitive deformation member is located to displace the needle portion.

24. The refrigerant flow-amount controlling device according to claim 18, wherein the refrigerant temperature in the cycle system is a temperature of a low-pressure side refrigerant after being decompressed by the nozzle portion or the throttle means.

25. The refrigerant flow-amount controlling device according to claim 18, wherein the refrigerant temperature in the cycle system is a temperature of a high-pressure side refrigerant before being decompressed by at least one of the nozzle portion and the throttle means.

26. The refrigerant flow-amount controlling device according to claim 18, wherein the temperature-sensitive deformation member is a spring member having a spring constant changed in accordance with the refrigerant temperature in the cycle system.

27. The refrigerant flow-amount controlling device according to claim 18, wherein the first evaporator, the second evaporator and the ejector are integrally joined to form an integrated unit.

28. The refrigerant flow-amount controlling device according to claim 27, wherein:
the first evaporator includes a first header tank for distributing and collecting refrigerant;
the second evaporator includes a second header tank for distributing and collecting refrigerant; and
the ejector has a longitudinal direction that is parallel to a longitudinal direction of the first header tank and a longitudinal direction of the second header tank.

29. The refrigerant flow-amount controlling device according to claim 27, wherein:
the ejector further includes an ejector body having the refrigerant suction port, an ejector housing for accommodating the nozzle portion and the ejector body; and
the ejector housing, the first evaporator and the second evaporator are integrally joined.

30. An ejector refrigerant cycle system having a refrigerant cycle through which refrigerant circulates, comprising:
a compressor for compressing refrigerant;
a radiator for cooling high-temperature high-pressure refrigerant discharged from the compressor;
a branch portion located to divide the refrigerant from the radiator into a first stream and a second stream;
an ejector having a nozzle portion for decompressing refrigerant of the first stream, and a refrigerant suction port from which refrigerant is drawn by a high-speed flow of refrigerant jetted from the nozzle portion;
a first evaporator for evaporating refrigerant flowing out of the ejector;
a throttle means for decompressing and expanding refrigerant of the second stream;
a second evaporator, disposed downstream of the throttle means and upstream of the refrigerant suction portion, for evaporating refrigerant; and
an adjusting mechanism having a temperature-sensitive deformation member that is deformed in accordance with a variation in a refrigerant temperature of the refrigerant cycle to adjust one refrigerant passage area of the nozzle portion and the throttle means,
wherein the adjusting mechanism is provided to adjust a flow ratio of a first refrigerant flow amount decompressed by the nozzle portion of the ejector and a second refrigerant flow amount drawn into the refrigerant suction port of the ejector.

31. An ejector refrigerant cycle system having a refrigerant cycle through which refrigerant circulates, comprising:
a compressor for compressing refrigerant;
a radiator for cooling high-temperature high-pressure refrigerant discharged from the compressor;
a branch portion located to divide the refrigerant from the radiator into a first stream and a second stream;
an ejector having a nozzle portion for decompressing refrigerant of the first stream, and a refrigerant suction port from which refrigerant is drawn by a high-speed flow of refrigerant jetted from the nozzle portion;
a first evaporator for evaporating refrigerant flowing out of the ejector;
a throttle means for decompressing and expanding refrigerant of the second stream; and
a second evaporator, disposed downstream of the throttle means and upstream of the refrigerant suction portion, for evaporating refrigerant, wherein
one of the ejector and the throttle means adjusts its refrigerant passage area based on a temperature of refrigerant on a downstream side of the radiator such that a pressure of refrigerant on the downstream side of the radiator approaches a predetermined value, and
the other one of the ejector and the throttle means has a temperature-sensitive deformation member that changes a refrigerant passage area of the other one thereof to adjust a flow ratio of a first refrigerant flow amount decompressed by the nozzle portion of the ejector and a second refrigerant flow amount drawn into the refrigerant suction port of the ejector.

32. An ejector refrigerant cycle system having a refrigerant cycle through which refrigerant circulates, comprising:
a compressor for compressing refrigerant;
a radiator for cooling high-temperature high-pressure refrigerant discharged from the compressor;
a branch portion located to divide the refrigerant from the radiator into a first stream and a second stream;
an ejector having a nozzle portion for decompressing refrigerant of the first stream, a refrigerant suction port from which refrigerant is drawn by a high-speed flow of refrigerant jetted from the nozzle portion, a diffuser portion in which the pressure of mixed refrigerant of the refrigerant jetted from the nozzle portion and the refrigerant drawn from the refrigerant suction port is increased by a pressure increasing amount;
a first evaporator for evaporating refrigerant flowing out of the ejector;
a throttle means for decompressing and expanding refrigerant of the second stream;
a second evaporator, disposed downstream of the throttle means and upstream of the refrigerant suction portion, for evaporating refrigerant; and
adjusting means for adjusting a flow ratio of a first refrigerant flow amount flowing into the nozzle portion and a second refrigerant flow amount drawn into the refrigerant suction port, based on the pressure increasing amount in the diffuser portion of the ejector.

* * * * *